(12) United States Patent
Bell

(10) Patent No.: US 10,717,093 B2
(45) Date of Patent: Jul. 21, 2020

(54) REVERSING MECHANISM FOR IRRIGATION SPRINKLER WITH DISENGAGING GEARS

(71) Applicant: Hunter Industries, Inc., San Marcos, CA (US)

(72) Inventor: James A. Bell, Carlsbad, CA (US)

(73) Assignee: Hunter Industries, Inc., San Marcos, CA (US)

( * ) Notice: Subject to any disclaimer, the term of this patent is extended or adjusted under 35 U.S.C. 154(b) by 187 days.

(21) Appl. No.: 16/035,522

(22) Filed: Jul. 13, 2018

(65) Prior Publication Data

US 2018/0318854 A1 Nov. 8, 2018

Related U.S. Application Data

(62) Division of application No. 14/971,620, filed on Dec. 16, 2015, now Pat. No. 10,029,265.

(60) Provisional application No. 62/096,113, filed on Dec. 23, 2014.

(51) Int. Cl.
| | |
|---|---|
| *B05B 3/00* | (2006.01) |
| *B05B 3/04* | (2006.01) |
| *B05B 15/74* | (2018.01) |
| *F16H 3/34* | (2006.01) |

(52) U.S. Cl.
CPC ............ *B05B 3/0431* (2013.01); *B05B 15/74* (2018.02); *F16H 3/34* (2013.01)

(58) Field of Classification Search
CPC .......... B05B 3/0431; B05B 15/10; F16H 3/34

USPC ....... 239/206, 200, 201, 203, 205, 240, 242, 239/263, 263.3, 256; 192/56.1; 464/30, 464/33, 39, 40, 44; 403/147

See application file for complete search history.

(56) References Cited

U.S. PATENT DOCUMENTS

| | | | | | |
|---|---|---|---|---|---|
| 3,107,056 | A | * | 10/1963 | Hunter | B05B 15/70 239/206 |
| 3,111,822 | A | * | 11/1963 | Hansen | F16D 49/04 464/40 |
| 3,334,817 | A | * | 8/1967 | Miller | B05B 3/0404 239/113 |
| 3,637,138 | A | * | 1/1972 | Rucker | B05B 3/0445 239/227 |
| 3,700,838 | A | * | 10/1972 | Brown | G04F 3/06 200/38 R |
| 3,878,990 | A | * | 4/1975 | Geraudie | B05B 3/0454 239/236 |
| 3,921,912 | A | * | 11/1975 | Hayes | B05B 1/12 239/242 |

(Continued)

*Primary Examiner* — Viet Le
(74) *Attorney, Agent, or Firm* — Knobbe Martens Olson & Bear, LLP

(57) ABSTRACT

An irrigation sprinkler can include a reversing mechanism configured to transition the nozzle turret of the irrigation sprinkler between a forward direction of rotation and a reverse direction of rotation. The reversing mechanism can include shifting frame having an input gear and at least one output gear. The at least one output gear can be mounted on an axle of rotation which permits lateral movement of the at least one output gear between a power transmitting position, wherein rotational power from a gear reduction is transferred to the nozzle turret, and a disengaged position wherein rotational power from the gear reduction is not transferred to the nozzle turret.

21 Claims, 14 Drawing Sheets

(56) References Cited

U.S. PATENT DOCUMENTS

| | | | |
|---|---|---|---|
| 3,934,820 A * | 1/1976 | Phaup | B05B 3/0436 239/205 |
| 4,305,326 A * | 12/1981 | Sallach | F16D 7/10 89/33.25 |
| 4,417,691 A * | 11/1983 | Lockwood | B05B 3/0422 239/206 |
| 4,568,024 A * | 2/1986 | Hunter | B05B 3/0431 239/242 |
| 4,624,412 A * | 11/1986 | Hunter | B05B 15/70 239/232 |
| 4,625,914 A * | 12/1986 | Sexton | B05B 15/70 239/206 |
| 4,708,291 A * | 11/1987 | Grundy | B05B 3/0431 239/242 |
| 4,718,605 A * | 1/1988 | Hunter | B05B 3/0431 239/242 |
| 4,901,924 A * | 2/1990 | Kah, Jr. | B05B 3/0431 239/240 |
| 4,948,052 A * | 8/1990 | Hunter | B05B 3/0431 239/242 |
| 4,955,542 A * | 9/1990 | Kah, Jr. | B05B 3/0431 239/237 |
| 4,984,052 A | 1/1991 | Koshino et al. | |
| 5,048,757 A * | 9/1991 | Van Leeuwen | B05B 3/0431 239/205 |
| 5,058,806 A | 10/1991 | Rupar | |
| 5,086,977 A | 2/1992 | Kah, Jr. | |
| 5,098,021 A | 3/1992 | Kah, Jr. | |
| 5,148,991 A * | 9/1992 | Kah, Jr. | B05B 3/16 239/242 |
| 5,170,871 A * | 12/1992 | Batchelder | F16D 41/206 192/41 S |
| 5,199,646 A | 4/1993 | Kah, Jr. | |
| 5,288,022 A | 2/1994 | Sesser | |
| 5,375,768 A | 12/1994 | Clark | |
| 5,383,600 A * | 1/1995 | Verbera | B05B 15/70 239/205 |
| 5,417,370 A * | 5/1995 | Kah, Jr. | B05B 3/14 239/242 |
| 5,423,486 A | 6/1995 | Hunter | |
| 5,456,411 A | 10/1995 | Scott et al. | |
| 5,556,036 A | 9/1996 | Chase | |
| 5,653,390 A | 8/1997 | Kah, Jr. | |
| 5,673,855 A * | 10/1997 | Nguyen | B05B 3/0431 239/241 |
| 5,676,315 A * | 10/1997 | Han | B05B 3/0431 239/590 |
| 5,695,123 A * | 12/1997 | Le | B05B 3/0431 239/259 |
| 5,699,962 A | 12/1997 | Scott et al. | |
| 5,711,486 A | 1/1998 | Clark et al. | |
| 5,720,435 A | 2/1998 | Hunter | |
| 5,758,827 A * | 6/1998 | Van Le | B05B 3/0431 239/242 |
| 5,762,270 A | 6/1998 | Kearby et al. | |
| 5,918,812 A | 7/1999 | Butler | |
| 5,927,607 A | 7/1999 | Scott | |
| 5,988,523 A | 11/1999 | Scott | |
| 6,042,021 A * | 3/2000 | Clark | B05B 3/0431 239/205 |
| 6,050,502 A * | 4/2000 | Clark | B05B 3/0431 239/237 |
| 6,082,632 A | 7/2000 | Clark et al. | |
| 6,109,545 A | 8/2000 | Kah, Jr. | |
| 6,138,924 A | 10/2000 | Hunter et al. | |
| 6,227,455 B1 | 5/2001 | Scott et al. | |
| 6,241,158 B1 | 6/2001 | Clark et al. | |
| 6,244,521 B1 | 6/2001 | Sesser | |
| 6,336,597 B1 | 1/2002 | Kah, Jr. | |
| 6,364,217 B1 * | 4/2002 | Lockwood | B05B 15/70 239/242 |
| 6,457,656 B1 | 10/2002 | Scott | |
| 6,491,235 B1 | 12/2002 | Scott et al. | |
| 6,499,672 B1 | 12/2002 | Sesser | |
| 6,688,539 B2 | 2/2004 | Vander Griend | |
| 6,695,223 B2 | 2/2004 | Buetler et al. | |
| 6,732,950 B2 * | 5/2004 | Ingham, Jr. | B05B 15/70 239/205 |
| 6,732,952 B2 | 5/2004 | Kah, Jr. | |
| 6,817,543 B2 | 11/2004 | Clark | |
| 6,840,460 B2 | 1/2005 | Clark | |
| 6,848,632 B2 | 2/2005 | Clark | |
| 6,854,664 B2 | 2/2005 | Smith | |
| 6,866,588 B2 * | 3/2005 | Doornbos | E05F 5/10 192/12 BA |
| 6,921,030 B2 * | 7/2005 | Renquist | B05B 3/003 239/380 |
| 6,945,471 B2 * | 9/2005 | McKenzie | B05B 3/0431 239/237 |
| 7,040,553 B2 * | 5/2006 | Clark | B05B 3/0459 239/263.3 |
| 7,090,146 B1 * | 8/2006 | Ericksen | B05B 3/0431 239/200 |
| 7,240,860 B2 | 7/2007 | Griend | |
| 7,287,711 B2 | 10/2007 | Crooks | |
| 7,287,712 B2 | 10/2007 | Kah, Jr. | |
| 7,303,147 B1 | 12/2007 | Danner et al. | |
| 7,322,533 B2 | 1/2008 | Grizzle | |
| D580,373 S | 11/2008 | Stange et al. | |
| 7,503,346 B1 | 3/2009 | Clark | |
| D593,182 S | 5/2009 | Anuskiewicz | |
| 5,762,270 C1 | 10/2009 | Kearby et al. | |
| 7,611,077 B2 | 11/2009 | Sesser et al. | |
| 7,621,467 B1 | 11/2009 | Garcia | |
| 7,665,713 B1 | 2/2010 | Clark | |
| 7,677,469 B1 | 3/2010 | Clark | |
| 7,748,646 B2 | 7/2010 | Clark | |
| 7,828,229 B2 | 11/2010 | Kah, Jr. | |
| 7,828,230 B1 | 11/2010 | Anuskiewicz et al. | |
| 7,850,094 B2 | 12/2010 | Richmond et al. | |
| 7,861,948 B1 | 1/2011 | Crooks | |
| 7,891,370 B1 | 2/2011 | Stange | |
| 8,220,723 B2 | 7/2012 | Clark | |
| 8,282,022 B2 | 10/2012 | Porter | |
| 8,297,314 B2 | 10/2012 | Clark et al. | |
| 8,297,533 B2 | 10/2012 | Dunn et al. | |
| 8,313,043 B1 * | 11/2012 | Crooks | B05B 15/70 239/206 |
| 8,430,376 B1 | 4/2013 | Danner et al. | |
| 8,469,288 B1 * | 6/2013 | Clark | B05B 3/0431 239/242 |
| 8,474,733 B1 | 7/2013 | Clark et al. | |
| 8,556,193 B2 | 10/2013 | Anuskiewicz | |
| 8,567,698 B2 | 10/2013 | Kah, Jr. | |
| 8,596,559 B2 * | 12/2013 | Kah, Jr. | B05B 1/3026 239/201 |
| 8,622,317 B1 | 1/2014 | Anuskiewicz | |
| 8,628,027 B2 | 1/2014 | Kah, Jr. et al. | |
| 8,636,229 B1 | 1/2014 | Clark et al. | |
| 8,636,230 B1 | 1/2014 | Clark et al. | |
| 8,636,233 B2 | 1/2014 | Clark et al. | |
| 8,727,238 B1 | 5/2014 | Clark et al. | |
| 8,777,124 B2 | 7/2014 | Clark et al. | |
| 8,794,542 B1 | 8/2014 | Hunter et al. | |
| 8,888,019 B2 | 11/2014 | Clark | |
| 8,936,205 B2 | 1/2015 | Dunn et al. | |
| 8,939,384 B1 | 1/2015 | Anuskiewicz et al. | |
| 8,955,767 B1 | 2/2015 | Clark et al. | |
| 8,955,768 B1 * | 2/2015 | Clark | B05B 3/0431 239/242 |
| 9,149,827 B2 | 10/2015 | Anuskiewicz | |
| 9,156,043 B2 * | 10/2015 | Walker | B05B 3/021 |
| 9,169,944 B1 * | 10/2015 | Dunn | B05B 15/70 |
| 9,205,435 B2 * | 12/2015 | Clark | A01G 25/00 |
| 9,222,593 B1 | 12/2015 | Clark | |
| 9,296,004 B1 * | 3/2016 | Clark | B05B 15/70 |
| 9,302,287 B2 * | 4/2016 | Dunn | B05B 15/70 |
| 9,446,421 B1 | 9/2016 | Anuskiewicz et al. | |
| 9,481,003 B2 | 11/2016 | Clark et al. | |
| 9,578,817 B2 | 2/2017 | Dunn et al. | |
| 9,616,437 B2 * | 4/2017 | Onofrio | B05B 3/16 |

(56) References Cited

U.S. PATENT DOCUMENTS

| | | | |
|---|---|---|---|
| 9,662,668 B1 | 5/2017 | Clark et al. | |
| 9,699,974 B2 * | 7/2017 | Clark | B05B 15/70 |
| 2002/0023972 A1 * | 2/2002 | Kah, Jr. | B05B 3/0422 |
| | | | 239/242 |
| 2004/0050958 A1 * | 3/2004 | McKenzie | B05B 3/0431 |
| | | | 239/242 |
| 2005/0194464 A1 * | 9/2005 | Bruninga | B05B 15/70 |
| | | | 239/200 |
| 2006/0049275 A1 * | 3/2006 | Santiago | B05B 3/0436 |
| | | | 239/240 |
| 2006/0273193 A1 * | 12/2006 | Kah, Jr. | B05B 15/70 |
| | | | 239/206 |
| 2008/0142618 A1 * | 6/2008 | Smith | B05B 3/0436 |
| | | | 239/240 |
| 2012/0273593 A1 * | 11/2012 | Clark | B05B 3/0431 |
| | | | 239/242 |
| 2015/0048174 A1 * | 2/2015 | Onofrio | B05B 12/16 |
| | | | 239/1 |
| 2016/0325302 A1 | 11/2016 | Dunn et al. | |

* cited by examiner

REVERSING MECHANISM FOR IRRIGATION SPRINKLER WITH DISENGAGING GEARS

CROSS-REFERENCE TO RELATED APPLICATION

This application is a divisional application of U.S. patent application Ser. No. 14/971,620, filed Dec. 16, 2015, and entitled "REVERSING MECHANISM FOR IRRIGATION SPRINKLER WITH DISENGAGING GEARS," which claims benefit under 35 U.S.C. § 119(e) to U.S. Provisional Patent Application No. 62/096,113, filed Dec. 23, 2014, and entitled "REVERSING MECHANISM FOR IRRIGATION SPRINKLER WITH DISENGAGING GEARS." The entire contents of the above applications are hereby incorporated by reference and made a part of this specification. Any and all priority claims identified in the Application Data Sheet, or any correction thereto, are hereby incorporated by reference under 37 CFR § 1.57.

BACKGROUND

Technical Field

The present disclosure relates to sprinklers used in residential and commercial irrigation for watering turf and landscaping.

Description of the Related Art

In many parts of the United States, rainfall is insufficient and/or too irregular to keep turf and landscaping green and therefore irrigation systems are installed. Such systems typically include a plurality of sprinklers. One popular type of sprinkler is a pop-up rotor-type sprinkler. A turbine and a gear train reduction can be mounted in the sprinkler for rotating a nozzle turret at the top of the sprinkler. A reversing mechanism can be mounted in the riser along with an arc adjustment mechanism. In some gear train reductions, one or more inner gears engage corresponding ring gears formed on the inner surface of the sprinkler component. In some cases, the inner gears are held in contact to the ring gears with a spring force that is relatively weak. This allows an operator to manually rotate the nozzle housing during adjustment by enabling the inner gears to ratchet past the gear teeth of the ring gears.

SUMMARY

According to some embodiments, an irrigation sprinkler can include an outer case. The outer case can have a first end, a second end, and a case interior. The irrigation sprinkler can include a riser assembly. In some embodiments, the riser assembly includes a riser housing having a first end and a second end. The second end of the riser assembly can be positioned within the case interior. In some embodiments, the second end of the riser assembly is configured to receive pressurized water from the case interior. The riser assembly can include a turbine. The turbine can be positioned within the riser housing. In some embodiments, the turbine is configured to rotate in response to water entering the second end of the riser housing. The riser assembly can include a gear reduction. The gear reduction can be positioned within the riser housing and operatively connected to the turbine. In some embodiments, the riser assembly includes a reversing mechanism. The reversing mechanism can be operatively connected to the gear reduction. In some embodiments, the reversing mechanism is configured to transition between a forward configuration and a reverse configuration. The reversing mechanism can include an input gear. The input gear can be configured to rotate in response to rotation of the turbine. In some embodiments, the reversing mechanism includes a first output gear. The first output gear can be configured to selectively mesh with the input gear. In some embodiments, the reversing mechanism includes a ring gear. The ring gear can be configured to mesh with the first output gear. In some embodiments, the reversing mechanism includes a rotatable nozzle. The rotatable nozzle can be positioned on the first end of the riser housing. The rotatable nozzle can be rotatably connected to the ring gear. In some embodiments, the first output gear is configured to mesh with the input gear and with the ring gear to drive the ring gear in a forward rotation direction when the reversing mechanism is in the forward configuration. In some embodiments, the first output gear is configured to mesh with the ring gear and to unmesh from the input gear when a user manually rotates the ring gear in the forward direction when the reversing mechanism is in the forward configuration.

In some embodiments, the sprinkler includes one or more transfer gears meshed with the input gear. The sprinkler can include a second output gear configured to selectively mesh with one or more of the one or more transfer gears. In some embodiments, the second output gear is configured to mesh with a transfer gear of the one or more idle gears and with the ring gear to drive the ring gear in a reverse direction with the reversing mechanism is in the reverse configuration. In some embodiments, the second output gear is configured to mesh with the ring gear and to unmesh from every transfer gear in the transfer gear system when a user manually rotates the ring gear in the reverse direction when the reversing mechanism is in the reverse configuration.

In some embodiments, the sprinkler includes one or more transfer gears and/or a second output gear. In some embodiments, at least one of the one or more transfer gears and the second output gear is configured to move laterally to mesh and unmesh from at least one of the one or more transfer gears, the second output gear, the input gear, and the ring gear.

In some embodiments, the first output gear is mounted on a non-circular axel.

In some embodiments, the second output gear is mounted on a non-circular axel.

In some embodiments, the first output gear is capable of unmeshing from the input gear when the reversing mechanism is in the reverse configuration.

In some embodiments, the sprinkler includes a nozzle turret rotatably locked with the ring gear and manually accessible for rotation by hand when the riser housing receives pressurized water.

In some embodiments, an even number of transfer gears are positioned in a forward power transmission path between the first output gear and the input gear.

In some embodiments, the sprinkler includes a first output axle having a major axis. In some embodiments, the first output gear has a bearing hole with an inner diameter. In some embodiments, the major axis of the first output axle is less than 9/10 of the diameter of inner diameter of the bearing hole.

According to some variants, a reversing mechanism for an irrigation sprinkler can be configured to transition between a forward configuration and a reverse configuration. The reversing mechanism can include a reversing frame. In some embodiments, reversing mechanism include an input gear.

The input gear can be laterally fixed on the reversing frame. In some embodiments, the reversing mechanism includes a first output axel. The first output axel can have a first bearing surface portion. In some embodiments, the reversing mechanism includes a first output gear. The first output gear can be rotatably mounted on the first output axel. In some embodiments, the first output gear is configured to selectively mesh with the input gear and with a ring gear. In some embodiments, the first output gear is configured to engage with the first bearing surface portion, to mesh with the input gear, and/or to mesh with the ring gear to rotate the ring gear in a forward direction when the reversing mechanism is in the forward configuration. In some embodiments, the first output gear is configured to disengage from the first bearing surface portion and to unmesh from the input gear when a user manually rotates the ring gear in the forward direction when the reversing mechanism is in the forward configuration.

In some embodiments, an irrigation sprinkler can include the reversing mechanism described above. The sprinkler can include an output member having a ring gear portion meshed with the first output gear when the reversing mechanism is in the forward configuration. In some embodiments, the sprinkler includes a nozzle turret rotatably connected to the output member.

In some embodiments, the first output axel has a non-circular cross-section.

In some embodiments, the reversing mechanism includes a transfer gear. The transfer gear can be meshed with the input gear. In some embodiments, the transfer gear is laterally fixed on the reversing frame. In some embodiments the reversing mechanism includes a second output axel. The second output axel can have a second bearing surface portion. In some embodiments, the reversing mechanism includes a second output gear. The second output gear can be rotatably mounted on the second output axel. In some embodiments, the second output gear is configured to engage with the second bearing surface portion, to mesh with the transfer gear, and to mesh with the ring gear to rotate the ring gear in a reverse direction when the reversing mechanism is in the reverse configuration. In some embodiments, the second output gear is configured to disengage from the second bearing surface portion and to unmesh from the transfer gear when a user manually rotates the ring gear in the reverse direction when the reversing mechanism is in the reverse configuration.

In some embodiments, the second output axel has a non-circular cross-section.

In some embodiments, the reversing mechanism includes an odd number of transfer gears positioned in a reverse power transmission path between the input gear and the second output gear.

In some embodiments, the second output gear is capable of unmeshing from the transfer gear when the reversing mechanism is in the forward configuration.

According to some variants, a shifting frame for a reversing mechanism of an irrigation sprinkler can include a first frame portion. The first frame portion can have a first surface and a second surface. In some embodiments, the shifting frame includes a first post. The first post can have a first cross-sectional shape with a major axis and a minor axis. In some embodiments, the first post extends from the first surface of the first frame portion. The shifting frame can include a second post. The second post can have a second cross-sectional shape with a major axis. In some embodiments, the second post extends from the surface of the first frame portion. The shifting frame can include a first output gear. The first output gear can have an inner hole with a first diameter. In some embodiments, the first output gear is mounted on the first post. The shifting frame can include an input gear that, in some embodiments, has an inner hole with a second diameter. The input gear can be mounted on the second post. In some embodiments, the major axis of the first cross-sectional shape of the first post is smaller than the first diameter of the first output gear and the minor axis is smaller than the major axis.

In some embodiments, the shifting frame includes a second frame portion. The second frame portion can have a first surface and a second surface. In some embodiments, the second surface of the second frame portion faces the first surface of the first frame portion. In some embodiments, the second frame portion has a first aperture extending from the second surface of the second frame portion toward the first surface of the second frame portion. The first aperture can be sized and shaped to receive at least portion of the first post.

In some embodiments, the minor axis of the first cross-sectional shape passes through a central axis of the second post.

In some embodiments, the shifting frame includes a third post. The third post can have a third cross-sectional shape with a major axis. In some embodiments the third post extends from the first surface of the first frame portion. In some embodiments, the shifting frame include a transfer gear. The transfer gear can have an inner hole with a third diameter. In some embodiments, the transfer gear is mounted on the third post. The shifting frame can include a fourth post. In some embodiments, the fourth post has a fourth cross-sectional shape with a major axis and a minor axis. The fourth post can extend from the first surface of the first frame portion. In some embodiments, the shifting frame includes a second output gear. The second output gear can have an inner hole with a fourth diameter. In some embodiments, the second output gear is mounted on the fourth post. In some embodiments, the major axis of the fourth cross-sectional shape of the fourth post is smaller than the fourth diameter of the second output gear. In some embodiments, the minor axis of the fourth cross-sectional shape is smaller than the major axis of the fourth cross-sectional shape.

In some embodiments, the minor axis of the fourth cross-sectional shape passes through a central axis of the third post.

In some embodiments, the shifting frame includes a second frame portion having a first surface and a second surface. In some embodiments, one or more of the first post, the second post, the third post, and the fourth posts extends from the second surface of the second frame portion.

According to some variants, a method of adjusting an arc length of a rotary irrigation sprinkler can include manually rotating a ring gear of a reversing mechanism of the rotary irrigation sprinkler. The method can include automatically unmeshing an output gear of the reversing mechanism from an input gear of the reversing mechanism in response to the manual rotation of the ring gear.

In some embodiments, the method includes moving an output gear of the mechanism away from the ring gear in a lateral direction in response to manual rotation of the ring gear.

In some embodiments, the step of manually rotating the ring gear comprises manually rotating the ring gear at a manual rotational speed greater than a rotational speed imparted on the ring gear from a turbine of the sprinkler via the output gear.

In some embodiments, the step of manually rotating the ring gear comprises manually rotating a nozzle turret of the sprinkler.

In some embodiments, the method include pressurizing a riser of the rotary irrigation sprinkler with water before manually rotating the ring gear.

In some embodiments, the step of manually rotating the ring gear is performed when the rotary irrigation sprinkler is not pressurized with water.

In some embodiments, the method can be performed using any of the sprinkler, reversing mechanism, and/or shifting frame structure described above.

BRIEF DESCRIPTION OF THE DRAWINGS

These and other features, aspects and advantages are described below with reference to the drawings, which are intended to illustrate but not to limit the inventions. In the drawings, like reference characters denote corresponding features consistently throughout similar embodiments.

DETAILED DESCRIPTION

Irrigation sprinklers can be used to distribute water to turf and other landscaping. Types of irrigations sprinklers include pop-up, rotor-type, impact, spray and/or rotary-stream sprinklers. In some applications, such as that shown in FIG. 1, an irrigation system 2 can include multiple irrigation sprinklers 1 used to water a targeted area. One or more controllers (e.g., wireless and/or wired controllers) can be used to control the operation of multiple irrigation sprinklers. For example, one or more controllers can control when each of the sprinklers of the irrigation system transitions between an irrigating (e.g., ON) configuration and a non-irrigating (e.g., OFF) configuration. In some embodiments, the one or more controllers control the amount of water distributed by the sprinklers. The water source 9 for the irrigation system can be provided by a single water source, such as a well, a body of water, or water utility system. In some applications, multiple water sources are used.

Figure 1:
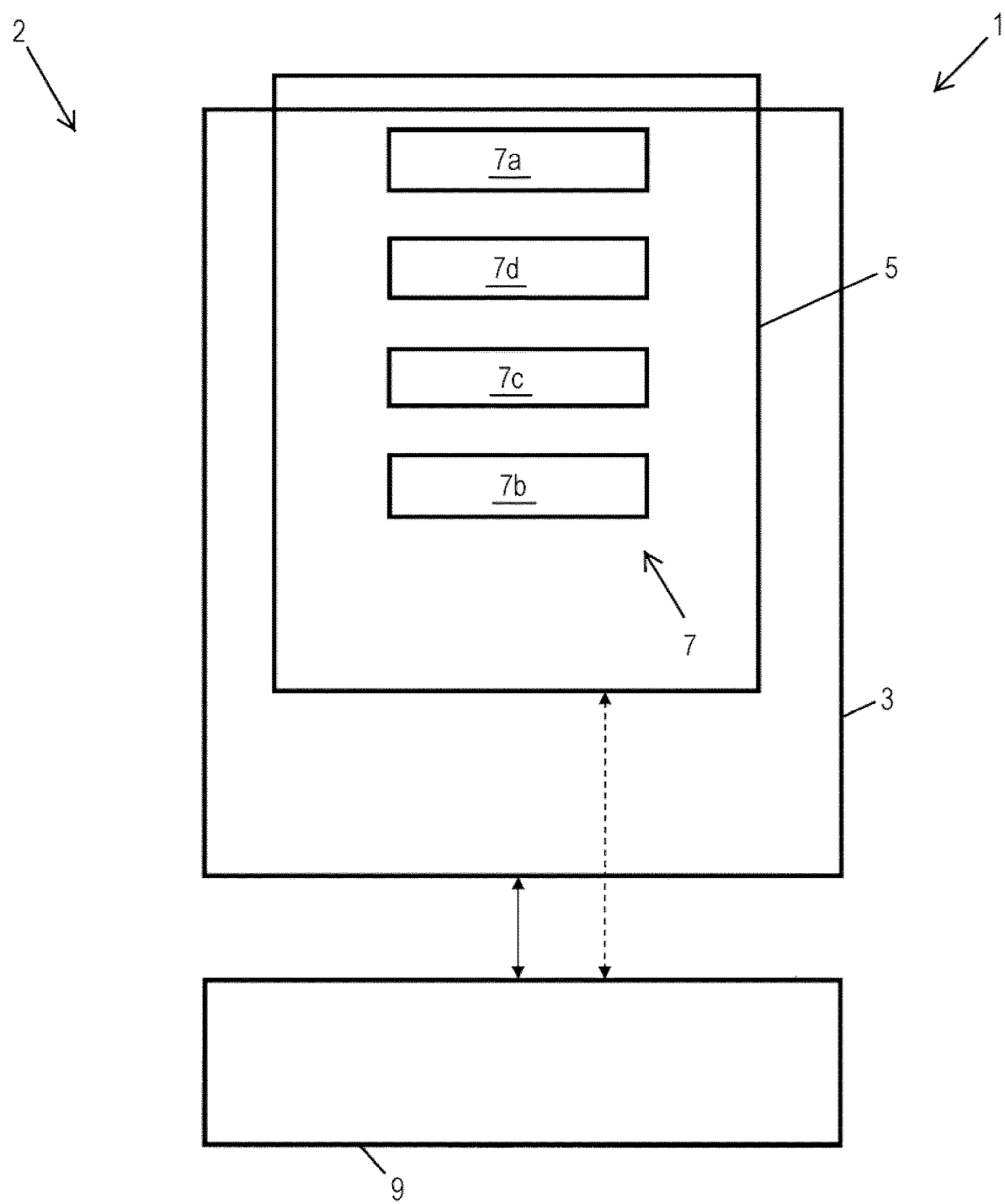
FIG. 1 is a schematic illustration of an irrigation sprinkler.

As schematically illustrated in FIG. 1, an irrigation sprinkler 1 can include an outer case 3. The outer case 3 can have a generally cylindrical shape or some other appropriate shape. A riser 5 can be positioned at least partially within the outer case 3. In some embodiments, such as pop-up sprinklers, the riser 5 is biased to a contracted or non-irrigating position within the outer case 3. The riser 5 may be biased to the contracted position by gravity and/or biasing structures such as springs. In some embodiments, the riser 5 transitions to an extended or irrigating position when pressure (e.g., water pressure) within the outer case 3 is high enough to overcome a biasing force on the riser 5. In some embodiments (e.g., non-pop-up sprinklers) the riser 5 is fixed in the extended position.

One or more mechanical components 7 can be positioned within the riser 5 and/or within the outer case 3. For example, the riser 5 can include an outlet 7a (e.g., a nozzle or outlet port). In some embodiments, the sprinkler 1 includes a plurality of outlets. The outlet 7a can direct water from the irrigation sprinkler 1 when the sprinkler 1 is ON. In some embodiments, the outlet 7a is connected to an outlet housing (e.g., a nozzle turret). The outlet housing and/or outlet 7a can be rotatable or otherwise moveable with respect to the riser 5 and/or outer case 3.

In some embodiments, the irrigation sprinkler 1 includes a turbine 7b. The turbine 7b can rotate in response to water entering an inlet end of the riser 5 and/or the outer case 3. The turbine 7b can be configured to rotate the outlet 7a. In some embodiments, a gear train reduction 7c is connected to the turbine 7b via an input shaft or otherwise. The gear train reduction 7c can transfer torque from the rotating turbine 7b to the outlet housing and/or outlet 7a via an output shaft, output clutch, or other output structure.

The sprinkler 1 can include a reversing mechanism 7d. The reversing mechanism 7d can be positioned within the riser 5 and/or within the outer case 3. In some embodiments, the reversing mechanism 7d is connected to the gear train reduction 7c and/or to the outlet 7a. The reversing mechanism 7d can be used to reverse the direction of rotation of the outlet 7a. In some embodiments, the reversing mechanism 7d reverses the direction of rotation of the outlet 7a without changing the direction of rotation of the turret 7b. In some embodiments, the reversing mechanism 7d reverses the direction of rotation of the outlet 7a by reversing the direction of rotation of the turret 7b.

In some embodiments, the reversing mechanism 7d reverses the direction of rotation of the outlet 7a via manual input. For example, a tool may be used to adjust the reversing mechanism 7d to reverse the direction of rotation of the outlet 7a. In some embodiments, the reversing mechanism 7d reverses the direction of rotation of the outlet 7a automatically via selected arc limiters. In some cases, at least one of the selected arc limiters can be adjusted to a desired position.

Water may be provided to the sprinkler 1 via one or more water sources 9. The water source 9 may be fluidly connected to the outer case 3 and/or to the riser 5. In some embodiments, fluid communication between the water source 9 and the sprinkler 1 is controlled by one or more controllers, valves, or other apparatuses.

Figure 2:
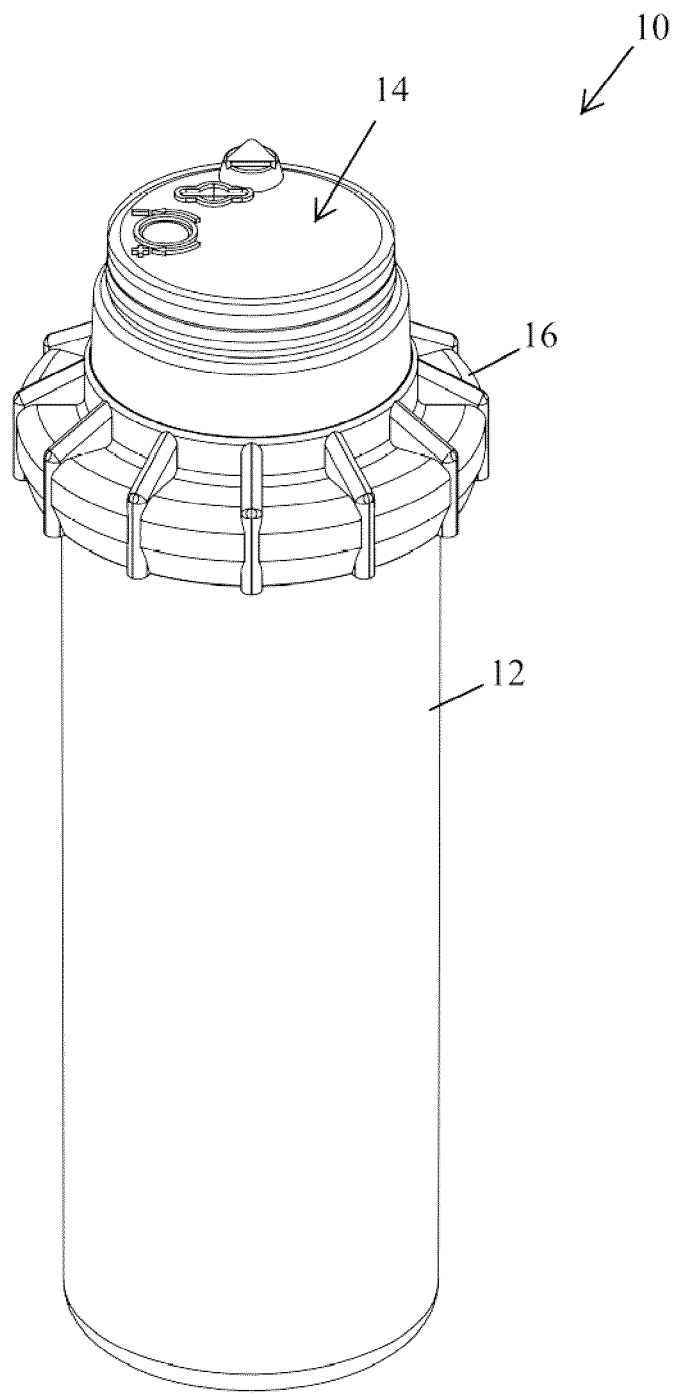
FIG. 2 illustrates an embodiment of a rotor-type sprinkler.
Figure 3:
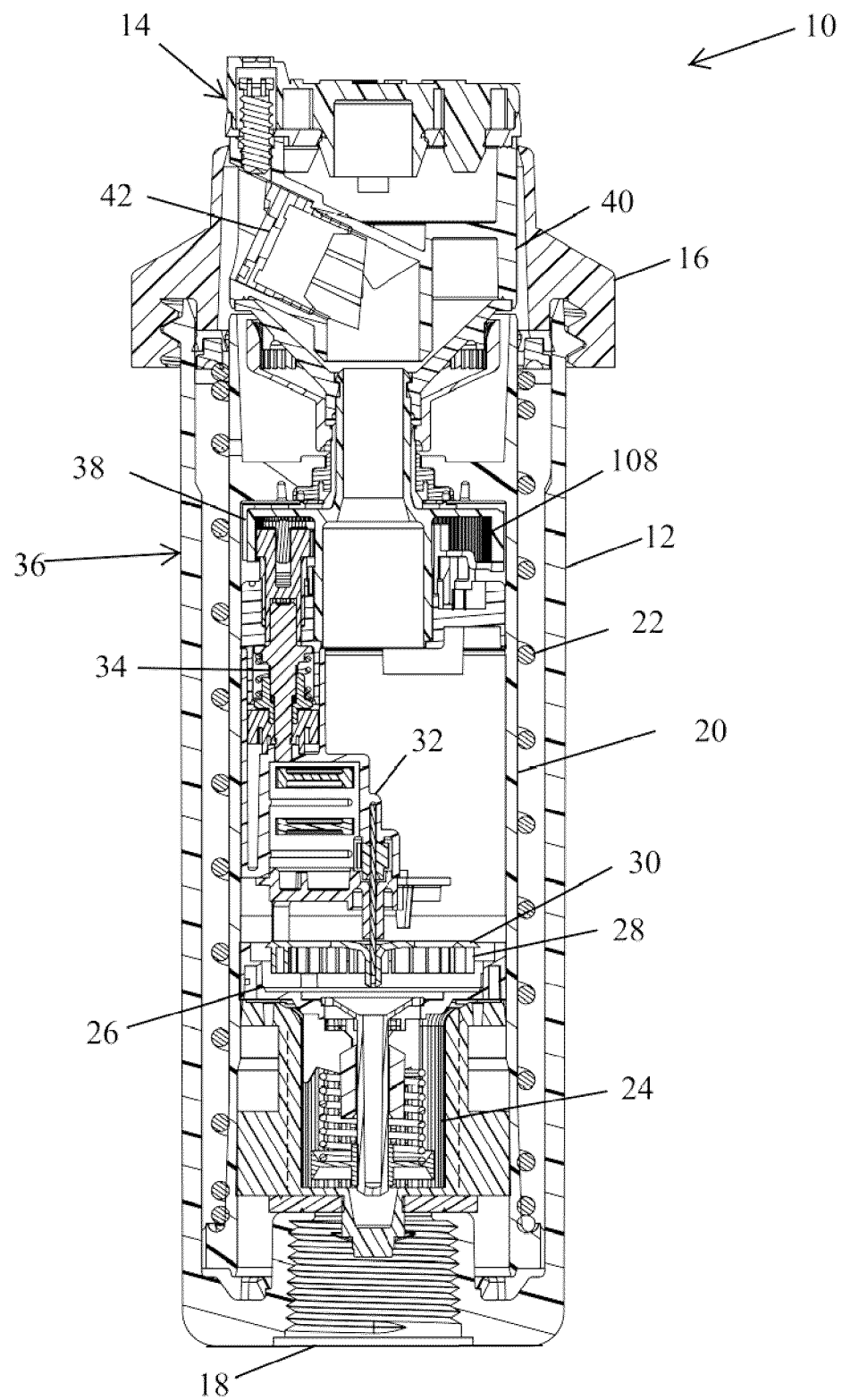
FIG. 3 is a vertical section view of the rotor-type sprinkler of FIG. 2.

As illustrated in FIGS. 2 and 3, a sprinkler 10 can include an outer case 12. The outer case 12 can have a first end (e.g., the upper end in the frame of reference of FIG. 2) and a second end (e.g., the lower end in the frame of reference of FIG. 2). The second end of the outer case 12 can include an inlet 18 configured to receive pressurized water from a water source. In some embodiments, the outer case 12 has a cylindrical shape.

The sprinkler 10 can include a riser assembly 14. The riser assembly 14 can have a first end (e.g., the upper end in the frame of reference of FIG. 2) and a second end (e.g., the lower end in the frame of reference of FIG. 2). The riser assembly 14 can transition between a retracted position (see, e.g., FIG. 1) and an extended position. In some embodiments, the sprinkler 10 includes a cap 16 configured to engage with the first end of the outer case 12. For example, the cap 16 can include threads configured to engage with threads on the first end of the outer case 12. Examples of sprinklers having outer cases and riser assemblies are provided in U.S. patent application Ser. No. 13/193,374, filed on Jul. 18, 2011, now issued as U.S. Pat. No. 8,636,230, the entire content of which is hereby incorporated by reference and made part of the present application.

The riser assembly 14 can include a riser housing 20. The riser housing 20 can have a first end (e.g., the upper end in the frame of reference of FIG. 3) and a second end (e.g., the lower end in the frame of reference of FIG. 3). The riser assembly 14 can be biased to the retracted position by a biasing member, such as a spring 22. The riser assembly 14 can be configured to transition to the extended position (not shown) upon introduction of pressurized water to the inlet 18 of the outer case 12. In some embodiments, a screen 24 or other filtering device can be positioned at or near the second end of the riser assembly 14. The screen 24 can be configured to inhibit passage of debris (e.g., rocks, twigs, soil, and/or sand) into the riser housing 20 from the pressurized water source.

Figure 4:
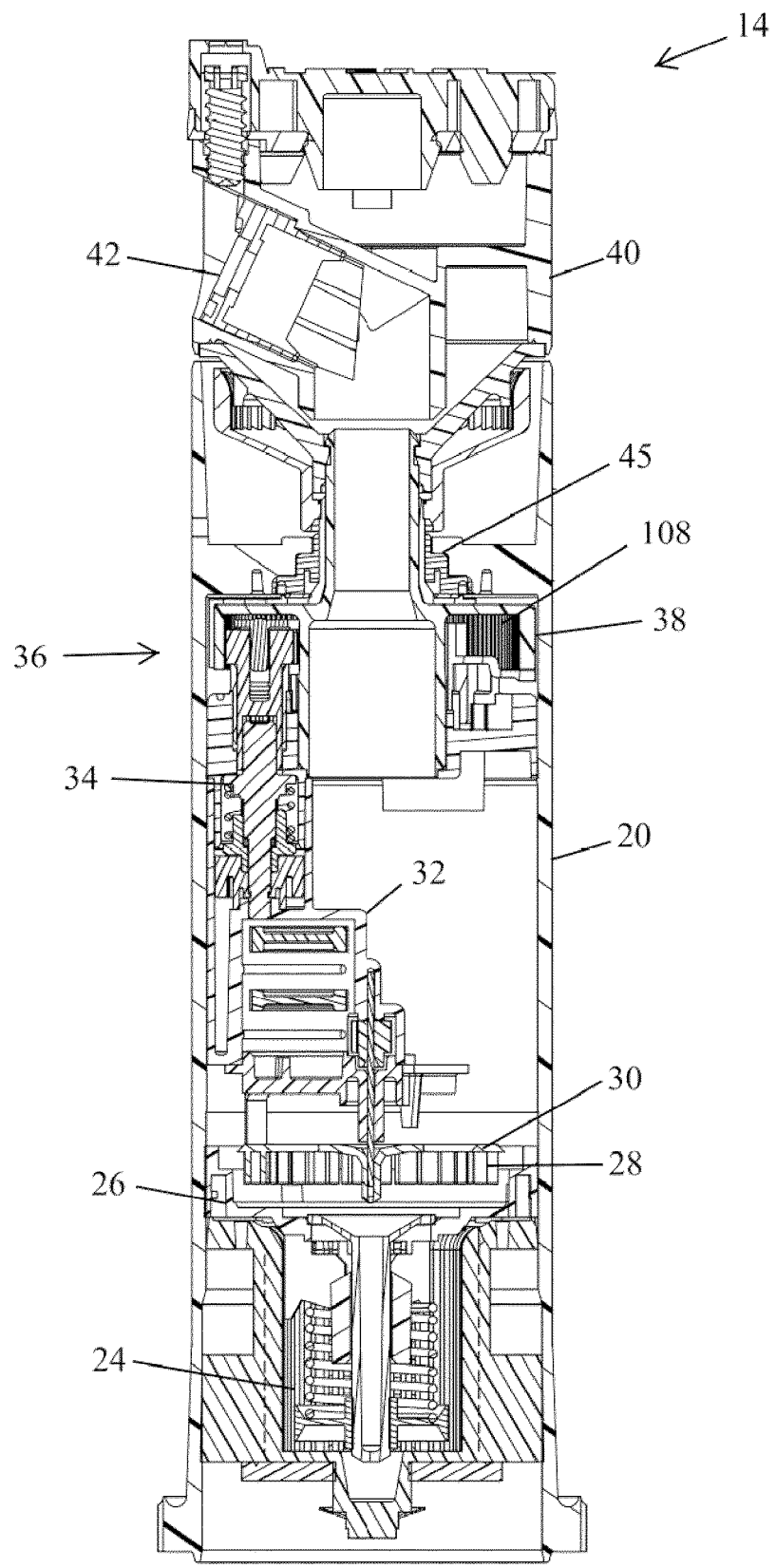
FIG. 4 is a vertical section of the riser assembly of the rotor-type sprinkler of FIG. 2.

As illustrated in FIGS. 3 and 4, the riser assembly 14 can include a turbine 30. The turbine 30 can include one or more turbine blades 28. The pressurized water entering the second end of the riser housing 20 via the outer case inlet 18 can rotate the turbine 30. In some embodiments, a stator 26 is positioned upstream (e.g., below) the turbine 30 to direct water flow to the turbine blades 28.

Rotation of the turbine 30 can drive rotation of a nozzle turret 40 at the first end of the riser assembly 14. In some embodiments, a gear reduction assembly 32 is positioned along a power transmission path between the turbine 30 and the nozzle turret 40. The gear reduction assembly 32 can, for example, have an input gear receiving rotational input from the turbine 30 at a first torque and a first RPM and an output member 38 transmitting rotational output from the gear reduction assembly 32 at a second torque and a second RPM. In some embodiments, the second torque is greater than the first torque and the second RPM is less than the first RPM.

In some embodiments, the riser assembly 14 includes a reversing mechanism 36 positioned in the power transmission path between the turbine 30 and the nozzle turret 40. For example, the reversing mechanism 36 can be positioned between the gear reduction assembly 32 and the nozzle turret 40. The reversing mechanism 36 can be configured to transition between a forward configuration and a reverse configuration. In the forward configuration, the reversing mechanism 36 can be configured to output a rotational power transmission in a first direction of rotation to rotate the nozzle turret 40 in a first (e.g., forward) direction. In the reverse configuration, the reversing mechanism can be configured to output a rotational power transmission in a second direction of rotation, opposite the first direction of rotation, to rotate the nozzle turret 40 in a second (e.g., reverse) direction. As illustrated, a clutch 34 can be positioned in the power transmission path between the gear reduction 32 and the reversing mechanism 36.

Figure 5:
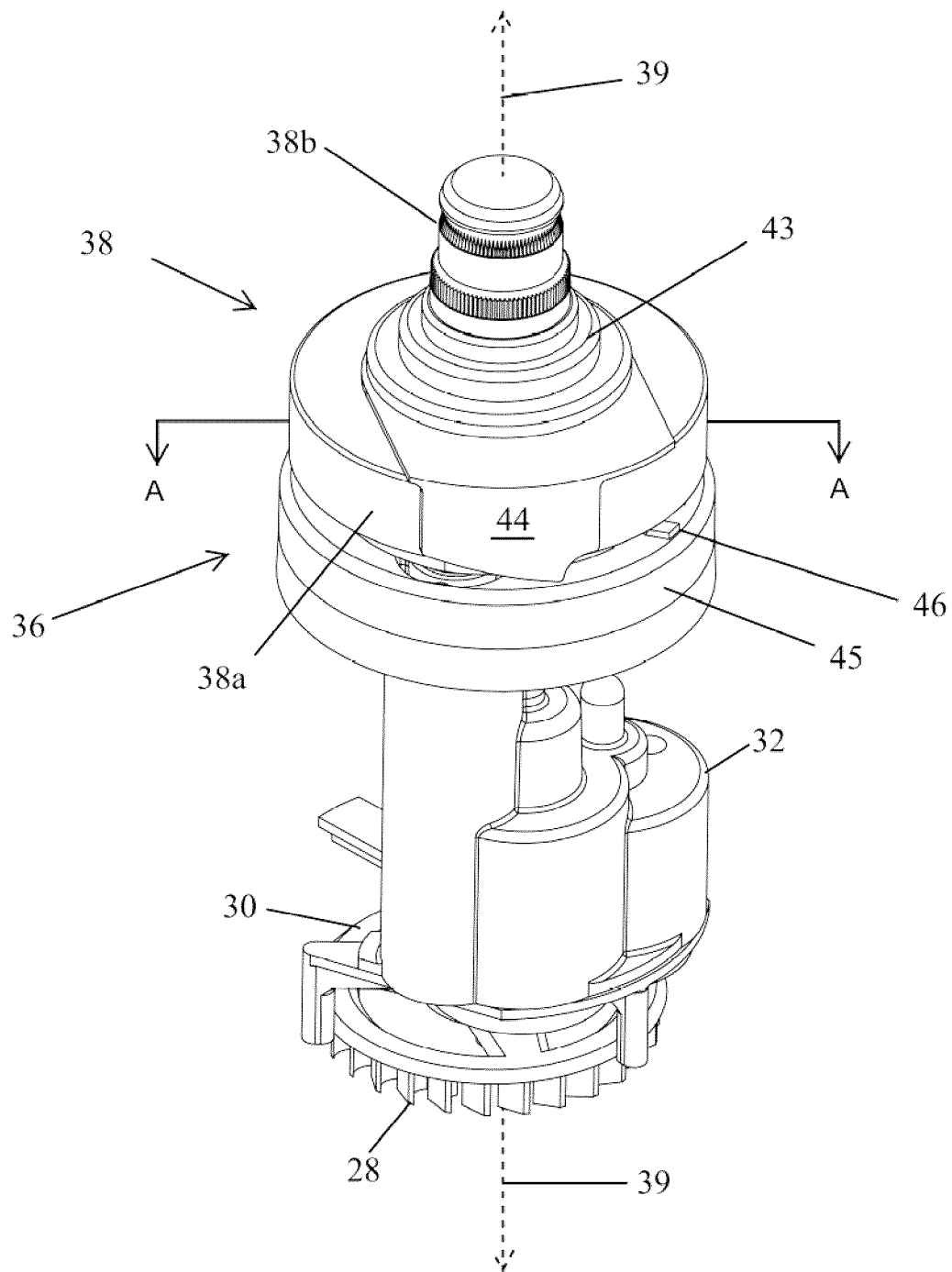
FIG. 5 is a view of the gear drive and reversing mechanism of the sprinkler of FIG. 2.
Figure 6:
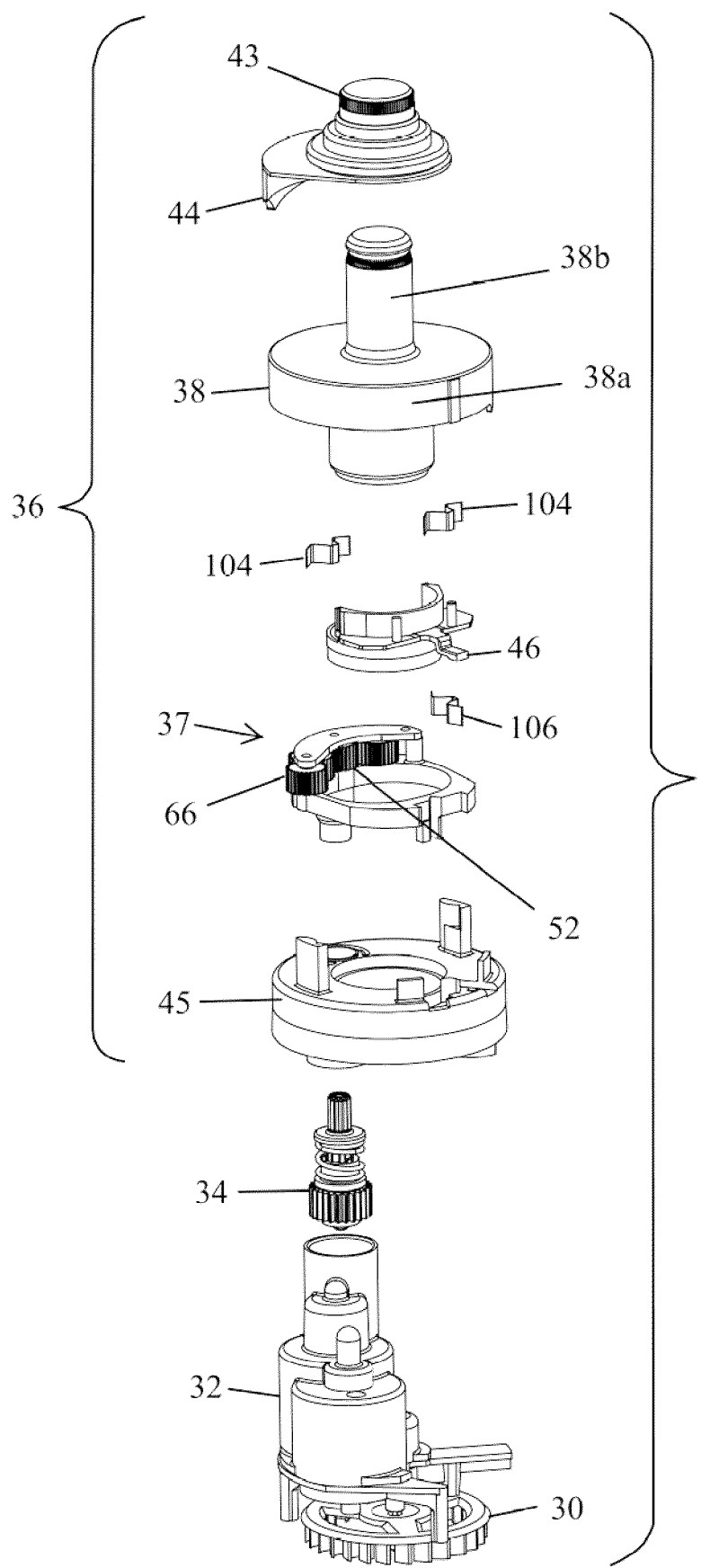
FIG. 6 is an exploded view of FIG. 3 illustrating further details of the reversing mechanism of FIG. 2.

As illustrated in FIGS. 5 and 6, the reversing mechanism 36 can include a shifting frame 37. As described in more detail below, one or more gears can be mounted on or otherwise attached to the shifting frame 37. The shifting frame 37 can shift the reversing mechanism 36 between the forward and reverse configurations in response to movement of a shift mechanism. For example, a shift arm 46 can be connected to the shifting frame 37 and can transition between a first and second position to shift the reversing mechanism 36 between the reverse and forward configurations.

The output member 38 can include a ring gear portion 38a and a spline-fit portion 38b. The ring gear portion 38a can include internal teeth 108 (see, e.g., FIG. 7). The spline-fit portion 38b can be configured to connect to and/or rotationally lock with the nozzle turret 40. The output member 38 (e.g., the ring gear portion 38b) can connect to the reversing mechanism 36. For example, the ring gear portion 38b can be meshed with one or more of the plurality of gears on the shifting frame 37.

Figure 7:
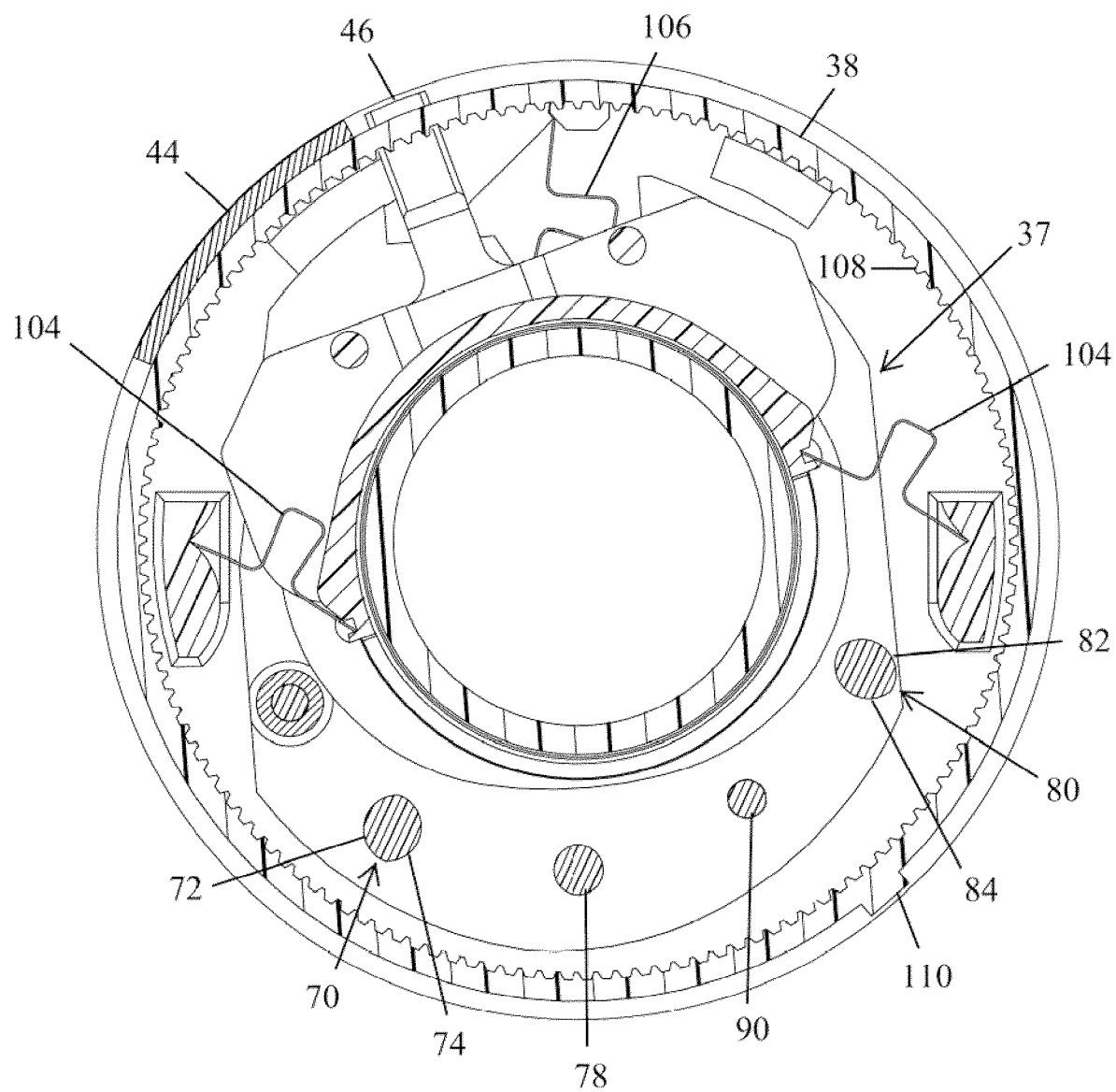
FIG. 7 is an enlarged section view of the reversing mechanism of FIG. 2 as viewed on the cut-plane A-A of FIG. 5, with the gears removed.

As illustrated in FIG. 5, the output member 38 can rotate with respect to the shift arm 46 about a central axis 39. One or more arc tabs can be connected to (e.g., mounted on, co-molded with) the output member. The arc tabs can be configured to contact shift arm 46 during rotation of the output member 38 to shift the shift arm 46 between two or more position. In some embodiments, each of the arc tabs is fixed in position with respect to the output member 38. In some embodiments, one or more of the arc tabs can be adjustable with respect to the output member 38. For example, an adjustable arc tab 44 can connected to the output member 38. The adjustable arc tab 44 can be configured to move the shift arm 46 between the first and second positions when the tab 44 contacts the shift arm 46 during rotation of the output member 38. In some embodiments, the riser assembly 14 includes a fixed arc tab 110 (FIG. 7). The fixed arc tab 110 can be rotationally fixed to the output member 38 and/or to some other component of the riser assembly 14 and can transition the shift arm 46 between the first and second positions when the tab 110 contacts the shift arm 46 during rotation of the output member 38. The circumferential distance between the adjustable arc tab 44 and the fixed arc tab 110 can be adjusted via circumferential movement of the adjustable arc tab 44 with respect to the output member 38.

The shifting frame 37 and shift arm 46 can be mounted on a partition 45. The shifting frame 37 and/or shift arm 46 can be connected to the partition 45 via one or more springs 104, 106 (e.g., omega springs, coil springs, leaf springs, etc.). The shifting frame 37 can be positioned within the output member 38. For example, the shifting frame 37 can be surrounded by the gear teeth 108 of the ring gear portion 38*a* of the output member 38. Examples of arc tab reversing mechanisms are provided in U.S. patent application Ser. No. 86,039, filed Jan. 31, 1961, now issued as U.S. Pat. No. 3,107,056, U.S. patent application Ser. No. 13/925,578, filed Jun. 24, 2013, in U.S. patent application Ser. No. 09/198,911, filed Nov. 24, 1998, now issued as U.S. Pat. No. 6,050,502, and in U.S. patent application Ser. No. 11/612,801, filed Dec. 19, 2006, now issued as U.S. Pat. No. 7,861,948, the entire disclosures of which are hereby incorporated by reference and made part of the present application.

As explained above, the shifting frame 37 can be configured to shift the reversing mechanism 36 between the forward and reverse configurations. The shifting frame 37 can be configured to transition between two or more positions. For example, the shifting frame 37 can transition between a first position, wherein the reversing mechanism 36 is in a forward configuration, and a second position, wherein the reversing mechanism is in a reverse configuration. The shifting frame 37 can be biased away from a neutral position (e.g., a position between the first and second positions) by one or more springs or other biasing structures.

The shifting frame 37 can include one or more input, output, and/or transfer (e.g., idler) gears. In some embodiments, the shifting frame 37 includes two or more sets of spur gears positioned at two or more vertical (e.g., up and down in the frame of reference of FIGS. 3 and 4) positions. The output and transfer gears can be configured to rotate in response to an input rotation from the input gear(s). In some configurations, the shifting frame 37 moves one or more of the gears into and/or out of a meshed engagement with one or more other gears (e.g., the ring gear portion 38*a* of the output member 38) when the shifting frame 37 moves between the first and second positions. For example, the shifting frame 37 can have a first output gear that rotates in a first direction and a second output gear that rotates in a second direction in response input rotation from an input gear. The shifting frame 37 can position the first output gear in a meshed engagement with the ring gear portion 38*a* of the output member 38 when the shifting mechanism 37 is in the first position and can position the second output gear in a meshed engagement with the ring gear portion 38*a* of the output member 38 when the shifting mechanism 37 is in the second position.

Figure 8:
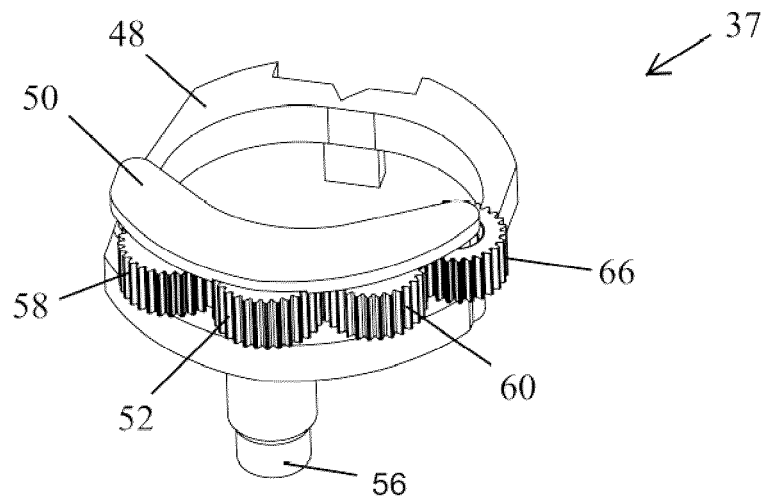
FIG. 8 is an enlarged isometric view of the shift frame assembly of the reversing mechanism of FIG. 2.
Figure 9:
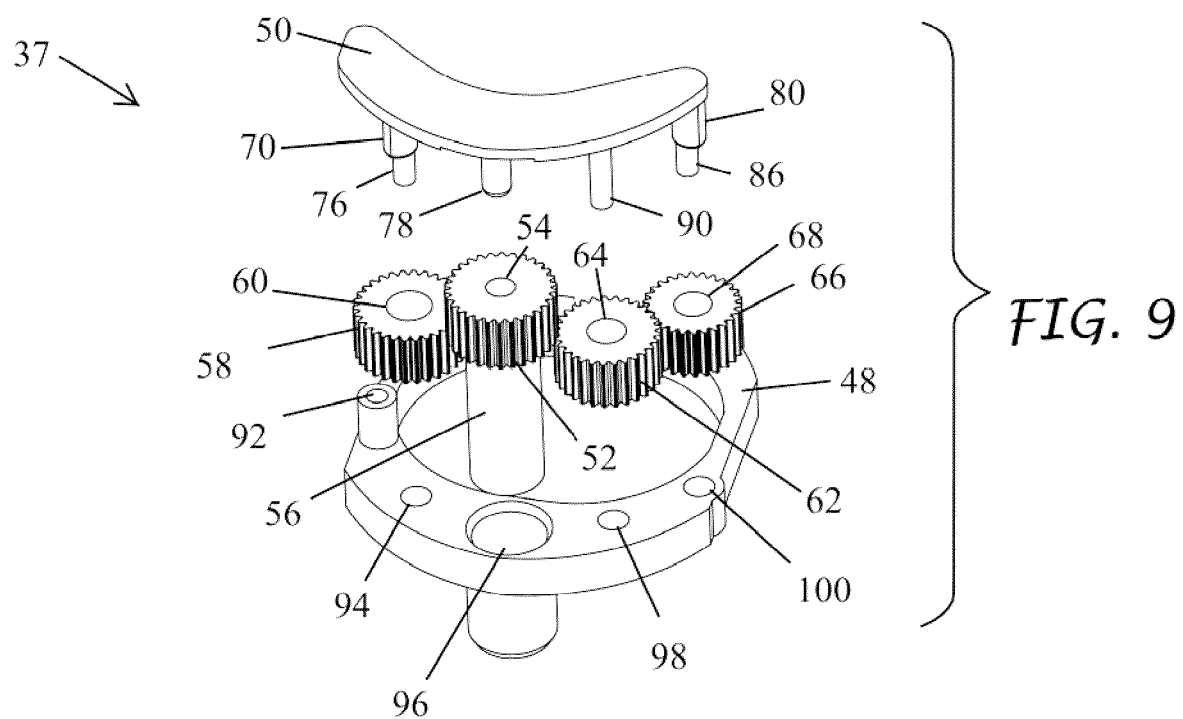
FIG. 9 is an exploded view of the shift frame of FIG. 8.

As illustrated in FIGS. 8 and 9, the shifting frame 37 can include a first or lower frame portion 48. The lower frame portion 48 can have an upper surface and a lower surface. In some embodiments, the lower frame portion 48 includes one or more apertures extending from the upper surface at least partially through a thickness of the lower frame portion 48 and/or one or more posts extending from the upper surface. For example, the lower frame portion 48 can include one or more posts on which one or more gears can be mounted.

Figure 10:
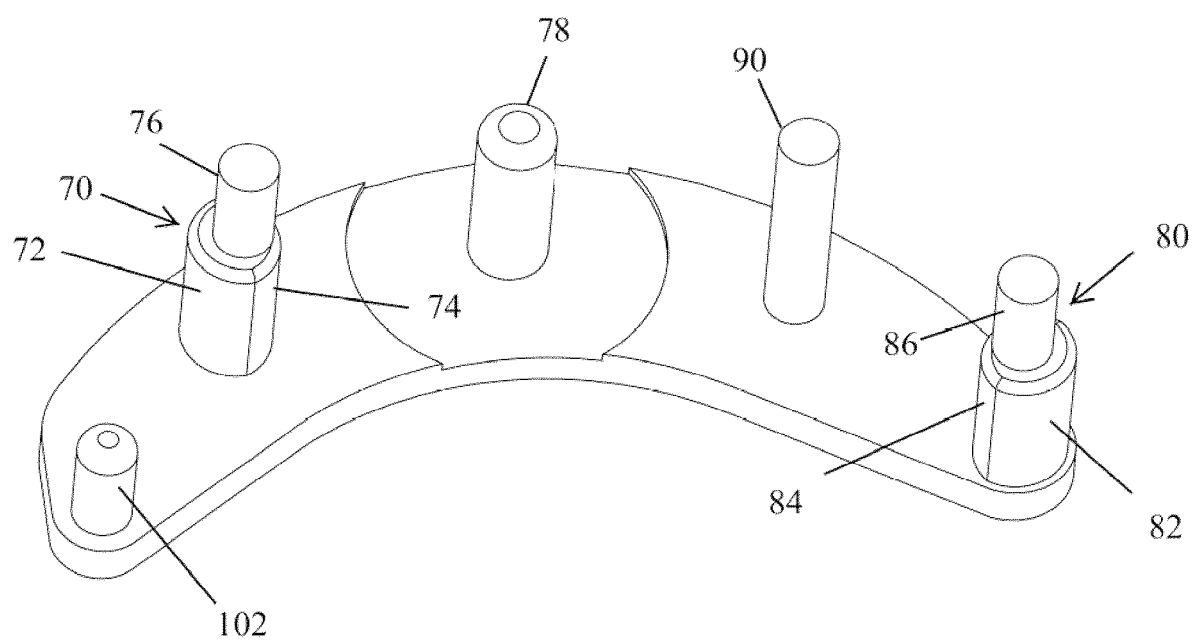
FIG. 10 is an enlarged isometric view of the upper shift frame of the reversing mechanism illustrated in FIG. 8.

In some embodiments, as illustrated in FIG. 9, the shifting frame 37 includes a second or upper frame portion 50. The upper frame portion 50 can include an upper surface and a lower surface. The upper frame portion 50 can include one or more posts extending from the lower surface of the upper frame portion 50 and/or one or more apertures or indentations sized and shaped to receive one or more posts of the lower frame portion 48. For example, as illustrated in FIGS. 9 and 10, the upper frame portion 50 can include a plurality of posts. One or more posts can be sized and shaped to fit on the posts of the upper frame portion 50. In some embodiments, the posts on the upper frame portion 50 are positioned, sized, and shaped to be at least partially inserted into apertures in the upper surface of the lower frame portion 48.

In some embodiments, the shifting frame 37 includes a plurality of upper frame portions having posts and/or apertures configured to couple with the posts and/or apertures of the lower frame portion 48. In some cases, the shifting frame 37 includes a plurality of lower frame portions having posts and/or apertures configured to couple with the posts and/or apertures of the upper frame portion 50. In some embodiments, the shifting frame 37 does not include an upper frame portion. For example, the gears of the shifting frame 37 can be mounted on posts extending from the lower frame 48. In some embodiments, the gears can be secured to the posts using clips, detents, friction fitting, or other coupling mechanisms or methods. In some cases, the shifting frame 37 does not include a lower frame portion. In some such cases, the gears are mounted on posts extending from the upper frame portion and are secured thereto using any of the mechanisms and/or methods recited above. In some embodiments, the shifting frame 37 includes upper and lower frame portions 48, 50 formed as a monolithic part (e.g., via 3D printing or some other method of manufacture).

One or more of the lower and upper shifting frames 48, 50 can include one or more posts configured to couple with one or more bosses on the opposite shifting frame. For example, as illustrated in FIG. 9, the upper frame portion 50 can include a post 102 configured to couple with a boss 92 on the lower frame portion 48. Engagement between the post 102 and the boss 92 can increase the stability of the connection between the lower frame portion 48 and the upper frame portion 50. In some embodiments, output axles 70, 80 can include frame mating portions 76, 86. The frame mating portions 76, 86 can be sized and shaped to fit corresponding apertures 94, 100 on the lower frame portion. In some embodiments, the frame mating portions 76, 86 have the same cross-sectional shape as the remainder of the output axles 70, 80. In some embodiments, as illustrated, the frame mating portions 76, 86 have cylindrical shapes.

The shifting frame 37 can include an input gear 52. The input gear 52 can be mounted on one or both of the lower frame portion 48 and the upper frame portion 50. The input gear 52 can receive power transmission from the gear reduction assembly 32, as illustrated in FIG. 6. For example, the input gear 52 can be rotationally linked to, and can receive rotational power transmission from, an output gear of the gear reduction assembly 32 and/or the clutch 34. As illustrated in FIGS. 8 and 9, the input gear 52 can be integral with or otherwise connected to a drive shaft 56. The drive shaft 56 can extend downward from the input gear 52 and can couple with an output gear of the gear reduction assembly and/or with the clutch 34.

In some embodiments, the drive shaft 56 extends through a first aperture 96 in the lower frame portion 48. The inner surface of the first aperture 96 can serve as a bearing portion to support (e.g., fit snugly around) the drive shaft 56. For example, the bearing portion can reduce or inhibit wobbling and/or lateral (e.g., non-parallel to the axis of rotation of the drive shaft) motion of the drive shaft 56 during power transmission from the gear reduction assembly 32 to the input gear 52. The input gear 52 can include an input gear hole 54. The hole 54 can be sized and shaped to receive an input gear post 78 of the upper frame portion 50. Coupling between the hole 54 and the post 78 can increase the stability of the input gear 52.

The shifting frame 37 can include a first output gear 58. The first output gear 58 can be mounted on the first output post or axle 70. The first output axle 70 can extend from the upper surface of the lower frame portion 48 or from a lower surface of the upper frame 50. As illustrated in FIG. 9, the first output axle 70 can extend from a lower surface of the upper frame portion 50 and into a first output axle aperture 94 in the lower frame portion 48.

The shifting frame 37 can include a second output gear 66. The second output gear 66 can be mounted on the second output post or axle 80. The second output axle 80 can extend from the upper surface of the lower frame portion 48 or from a lower surface of the upper frame 50. As illustrated in FIG. 9, the second output axle 80 can extend from a lower surface of the upper frame portion 50 and into a second output axle aperture 100 in the lower frame portion 48.

Figure 12:
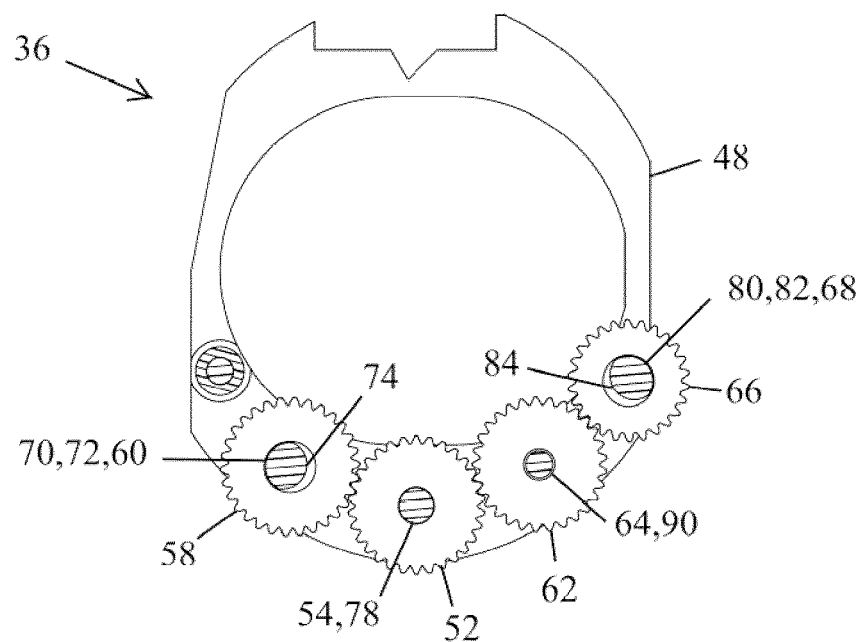
FIG. 12 is an enlarged section view of the shift frame assembly of FIG. 8 with the driven gears engaged.
Figure 13:
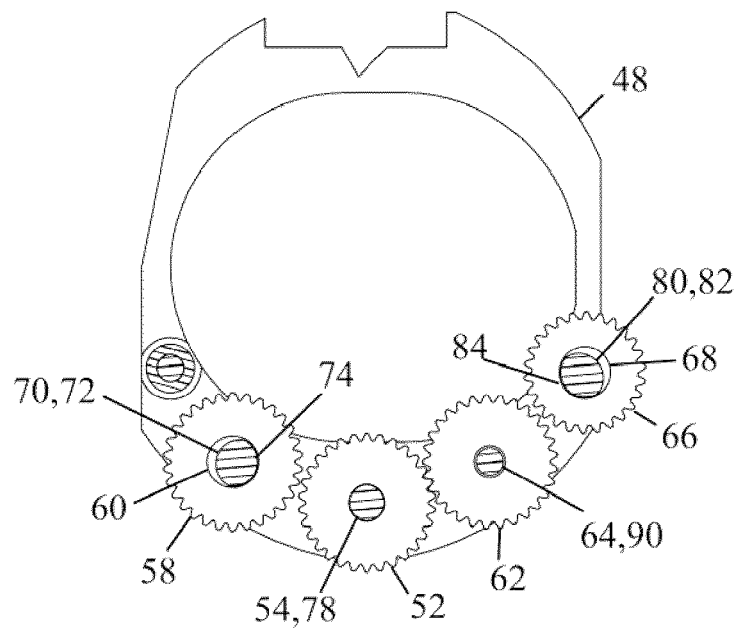
FIG. 13 is an enlarged section view of the shift frame assembly of FIG. 8 with the driven gears disengaged.

One or more transfer gears can be mounted on the shifting frame 37. For example, one or more transfer gears can be positioned in a rotational transmission path between the input gear 52 and at least one of output gears 58, 66. In some embodiments, zero or an even number of transfer gears are positioned between the input gear 52 and the first output gear 58 and an odd number of transfer gears are positioned between the input gear 52 and the second output gear 66. Positioning varying numbers of transfer gears (e.g., even v. odd numbers) between the input gear 52 and the two output gears 58, 66 can cause the output gears 58, 66 to rotate in opposite directions from each other in response to the rotational input of the input gear 52. In some embodiments, as illustrated in FIGS. 9 and 12-13, a single transfer gear 62 can be positioned between the input gear 52 and the second output gear 66. The single transfer gear 62 can direct rotation of the second output gear 66 in a direction opposite the direction of rotation of the first output gear 58. The transfer gear 62 can have a bearing hole 64 and can be loosely mounted on a transfer gear post 90 positioned between the input gear post 78 and the second output axle 80. The post 90 can extend from either the upper frame portion 50 or the lower frame portion 48 and extend into a corresponding aperture (e.g., the aperture 98 in the lower frame portion 48) in the opposite shifting frame.

In some embodiments, one or more of the first and second output axles 70, 80 can have a cross-sectional shape which permits lateral (e.g., perpendicular to the longitudinal axes of the axles) movement of one or more of the output gears 58, 66. For example, the first and second output axles 70, 80 can have cross-sectional widths (e.g., diameters, major axes, minor axes, etc.) which are smaller than the diameters of the holes of the gears mounted on the respective axles 70, 80. Lateral movement of the gears 58, 66 can bring the gears 58, 66 into and out of mesh with other gears (e.g., the input gear 52 and/or transfer gears). Disengagement of one or more gears from one or more other gears in the reversing mechanism 36 can inhibit or prevent transfer of rotational forces between the nozzle turret 40 and the gear reduction 32.

As illustrated in FIGS. 9-13, one or more of the first and second output axles 70, 80 can have a non-circular shape. For example, the first output axle 70 can have a first bearing portion 72 and a first clearance portion 74 opposite the bearing portion 72. The bearing portion 72 can be positioned and shaped to support (e.g., contact) the inner hole 60 of the first input gear 58 when the first input gear 58 is meshed with the input gear 52 or with a transfer gear (e.g., when the first input gear 58 receives rotational power from the gear reduction 32). In some embodiments, the first bearing portion 72 is on a side of the first output axle 70 opposite the input gear 52 and the first clearance portion 74 is on a side of the first output axial 70 nearest the input gear 52. As illustrated in FIG. 12, the axle 70 can be sized and shaped such that a gap is formed between the clearance portion 74 and the inner surface of the hole 60 when the gear 58 is in a meshed condition with the input gear 52.

Figure 11:
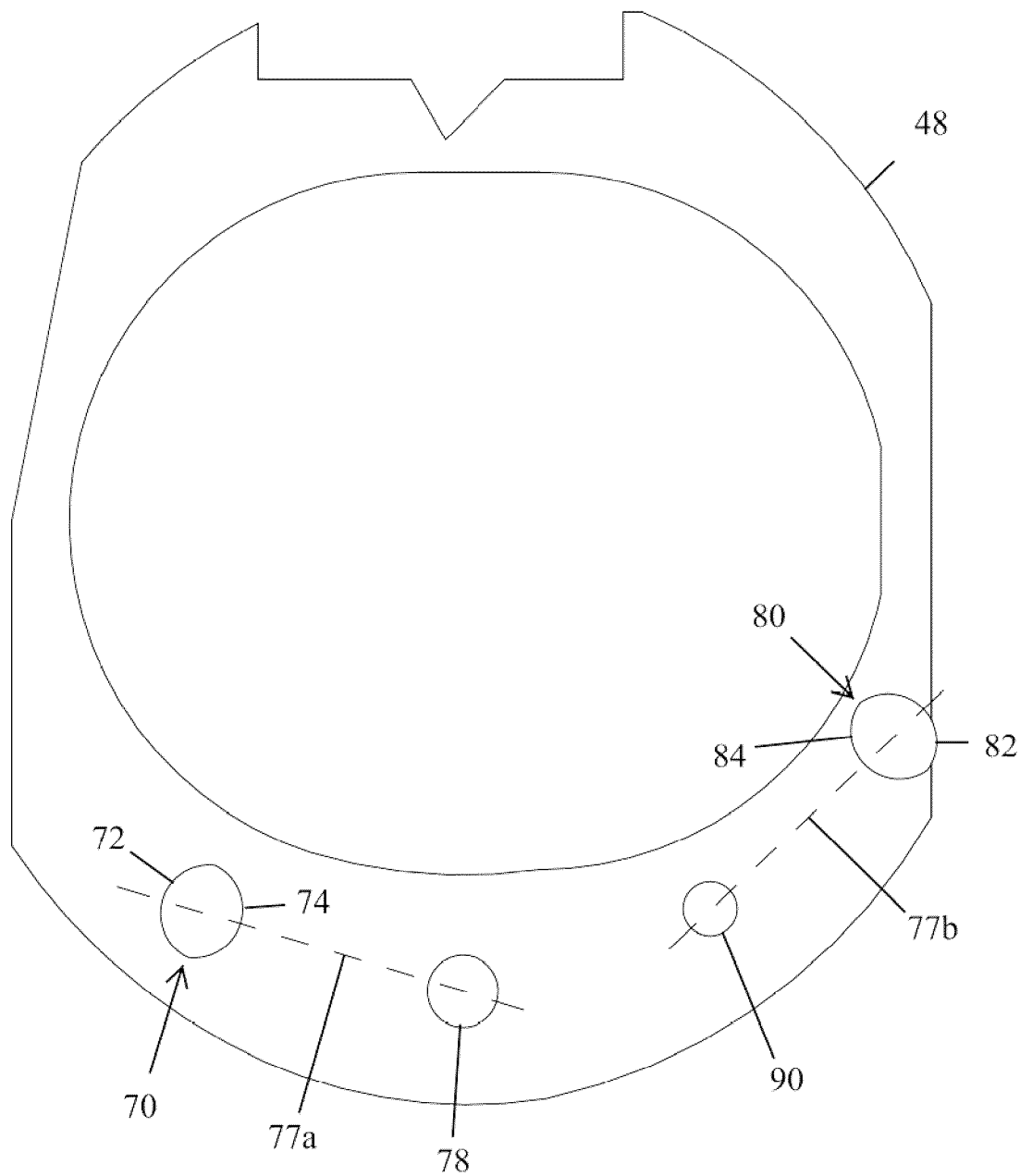
FIG. 11 is a schematic view of the axles of the upper shift frame installed in the lower shift frame.
Figure 11B:
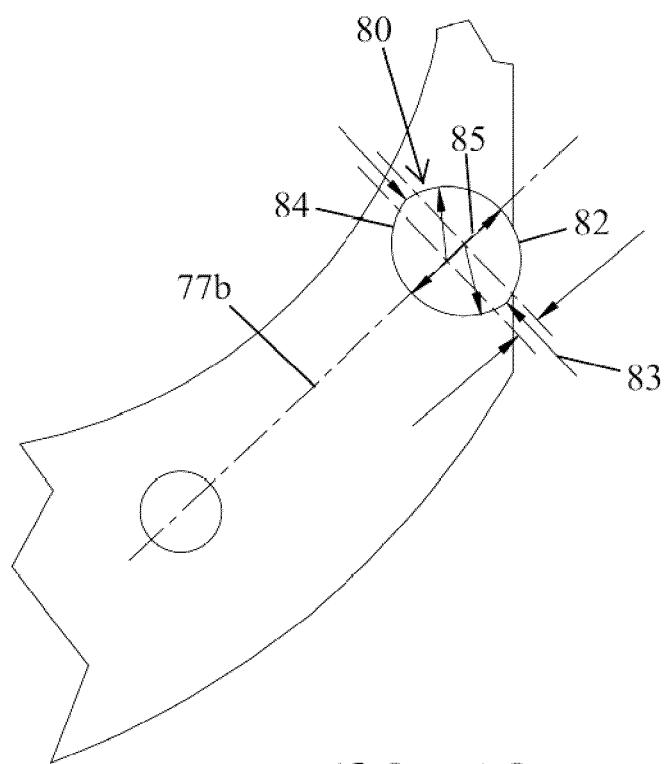
FIG. 11B is a schematic view of a second output axle.
Figure 11A:
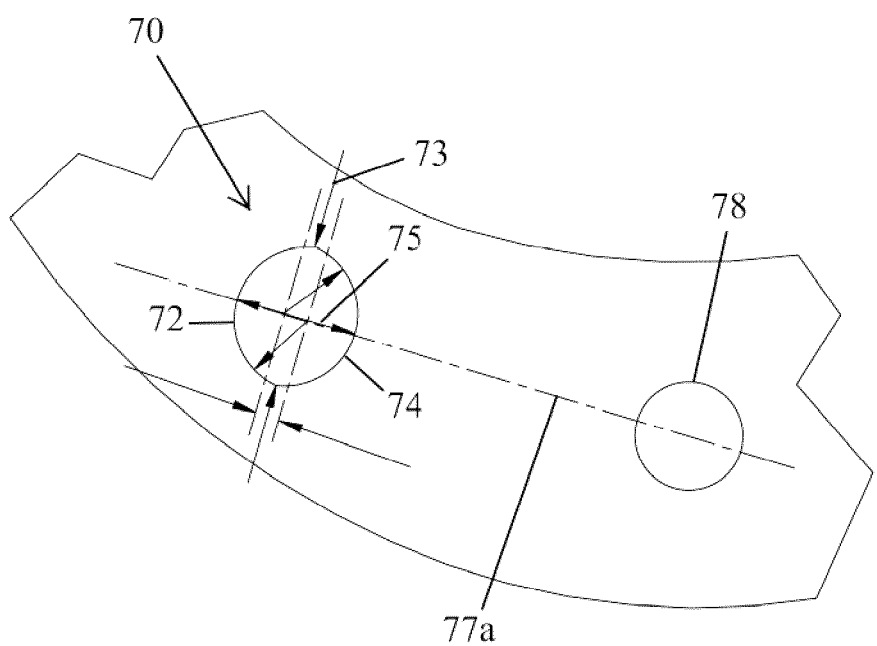
FIG. 11A is a schematic view of a first output axle.

As illustrated in FIG. 11, the first bearing portion 72 can have an arcuate length of less than 180 degrees as measured in the plane of FIG. 11. For example, the arcuate length of the first bearing portion 72 can be less than 170 degrees, less than 160 degrees, less than 150 degrees, less than 140 degrees, less than 130 degrees, and/or less than 120 degrees. In some embodiments, the arcuate length of the first bearing portion 72 is approximately 161 degrees.

In some embodiments, the cross-sectional shape of the first output axle 70 has a major axis 73 and a minor axis 75. The minor axis 75 can extend toward and away from the input gear 52. For example, the minor axis 75 can be collinear with a line 77a that passes through the centers of the first output axle 70 and the input gear post 78. In some embodiments, the minor axis 75 is offset from the line 77a that passes through the centers of the first output axle 70 and the input gear post 78 by less than 85 degrees, less than 75 degrees, less than 65 degrees, less than 55 degrees, less than 45 degrees, less than 35 degrees, less than 25 degrees, and/or less than 10 degrees.

The minor axis 75 can have a length less than the diameter of the hole 60 of the first output gear 58. For example, the minor axis 75 can be less than 9/10, less than 8/9, less than 7/8, less than 3/4, less than 5/8, less than 1/2, and/or less than 1/3 of the diameter of the hole 60. The major axis 73 can have a length less than the diameter of the hole 60. For example, the major axis 73 can be less than 9/10, less than 8/9, less than 7/8, less than 3/4, less than 5/8, less than 1/2, and/or less than 1/3 of the diameter of the hole 60. In some embodiments, the major axis 73 is approximately 15/16 of the diameter of the hole 60. In some embodiments, the minor axis 75 is approximately 4/5 of the diameter of the hole 60. In some embodiments, one or more of the output axles may be round (e.g., the major and minor axes can be equal).

The first bearing portion 72 can have a radius of curvature substantially equal to (e.g., within 10% of) the radius of the hole 60 of the first output gear 58. In some cases, the radius of curvature of at least a portion of the first bearing portion 72 can be less than 98%, less than 90%, less than 80%, less than 70% and/or less than 60% of the radius of the hole 60. In some cases, the radius of curvature of at least a portion of the first bearing portion 72 can be greater than 102%, greater than 110%, greater than 120%, greater than 130% and/or greater than 140% of the radius of the hole 60. In some embodiments, the first bearing portion 72 has an arcuate shape with a non-constant radius of curvature (e.g., the radius of curvature of the lateral ends of the first bearing portion 72 can be greater than or less than a radius of curvature of a middle portion of the first bearing portion 72).

The first clearance portion 74 can have a radius of curvature substantially equal to (e.g., within 10% of) the radius of the hole 60 of the first output gear 58. In some cases, the radius of curvature of at least a portion of the first clearance portion 74 can be less than 98%, less than 90%, less than 80%, less than 70% and/or less than 60% of the radius of the hole 60. In some cases, the radius of curvature of at least a portion of the first bearing portion 72 can be greater than 102%, greater than 110%, greater than 120%, greater than 130% and/or greater than 140% of the radius of the hole 60. In some embodiments, the first clearance portion 74 has an arcuate shape with a non-constant radius of curvature (e.g., the radius of curvature of the lateral ends of the first clearance portion 74 can be greater than or less than a radius of curvature of a middle portion of the first clearance portion 74). In some embodiments, the first clearance portion 74 has a flat shape. In some embodiments, the first clearance portion 74 has a convex shape.

As illustrated in FIGS. 11-13, the second output post 80 can have a bearing portion 82 and a clearance portion 84 opposite the bearing portion 82. The second output post 80 and corresponding portions 82, 84 can have the same or similar characteristics (e.g., radii of curvature, major and minor axes 83, 85, rotational alignment with respect to line 77*b*) with respect to the transfer gear 62 and transfer gear post 90 as the first output posts 70 and corresponding portions 72, 74 have with respect to the input post 78 and input gear 52.

FIGS. 12 and 13 provide schematic representations of the lateral movability of the output gears 58, 66 when mounted output axles 70, 80. Comparing FIGS. 12 and 13, it can be seen that the shape of the cross-sections of the output axles 70, 80 can permit lateral movement of the output gears 58, 66. For example, the output gears 58, 66 can be transitioned between respective power transmission positions (e.g., FIG. 12) and disconnected positions (FIG. 13). In the power transmission positions, the output gears 58, 66 are meshed with (e.g., ready for power transmission to or from) the input gear 52 and/or the transfer gear 62 and receive rotational power transmission from the input gear 52. In some embodiments, the walls of the holes 60, 68 in the output gears 58, 66 bear against the bearing portions 72, 82 of the output axles 70, 80 when the output gear 58, 66 are in their respective power transmission positions. When in the disconnected positions, the output gears 58, 66 are unmeshed from the input gear 52 and/or the transfer gear 62 and do not receive rotational power transmission from the input gear 52. In some embodiments the walls of the holes 60, 68 approach and/or contact the clearance portions 74, 84 of the output axles 70, 80 when the output gears 58, 66 are in their respective disconnected positions. In some cases, the walls of the holes 60, 68 do not contact the clearance portions 74, 84 of the output axles when the output gears 58, 66 are in their respective disconnected positions. Movement of the first output gear 58 between the power transmission position and the disconnected position can be permitted when both the minor and major axes 73, 75 are smaller than the diameter of the hole 60. Movement of the second output gear 66 between the power transmission position and the disconnected position can be permitted when both the minor and major axes 83, 85 are smaller than the diameter of the hole 68.

Figure 14:
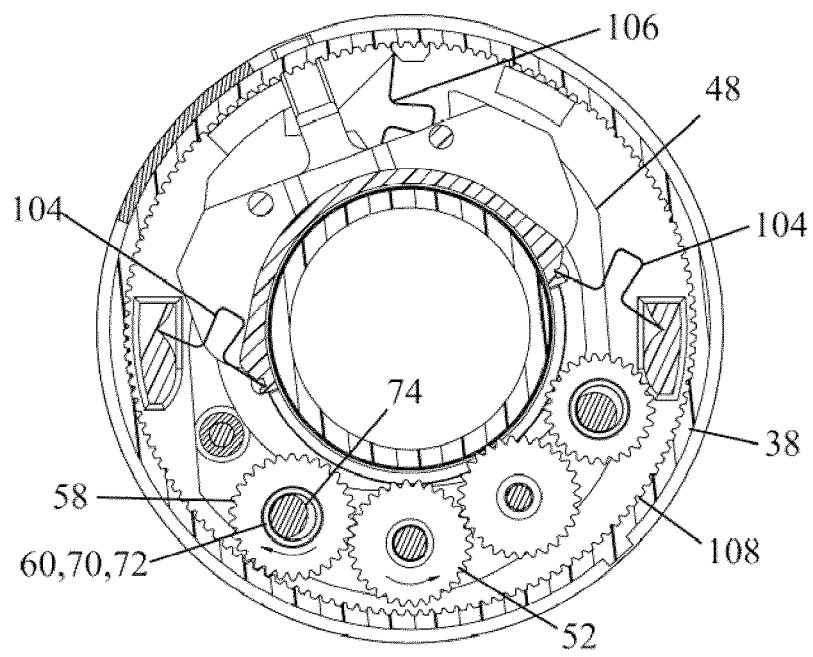
FIG. 14 is an enlarged section view of the reversing mechanism of FIG. 2 shifted to rotate the nozzle in a clockwise direction with the driven gears in an engaged position as viewed on the cut-plane A-A of FIG. 5.

FIG. 14 illustrates the reversing mechanism 36 in a first (e.g., forward) configuration. In the forward configuration, the first output gear 58 is meshed with the teeth 108 of the ring gear portion 38*a* of the output member 38. In some embodiments, as illustrated, the first output gear 58 is directly meshed with the input gear 52.

In the frame of reference of FIG. 14, the input gear 52 rotates in a first (e.g., counterclockwise) direction to drive the first output gear 58 in a second (e.g., clockwise) direction. Clockwise rotation of the first output gear 58 drives the output member 38 in a clockwise direction. As explained above, the output member 38 continues to rotate in the clockwise direction until one or more of the arc tabs contacts the shifting arm 46 to shift the shifting plate 37 to the reverse configuration (see, e.g., FIG. 16).

In some embodiments, it is desirable to set the arc positions (e.g., the spray pattern) of the irrigation sprinkler 10 when the sprinkler 10 is installed on site. Making adjustments to the arc positions on site can permit a user of the sprinkler 10 to precisely position the spray pattern with respect to the landscape features of the installation site. Such manual adjustment can be performed when the sprinkler 10 is pressurized or when the sprinkler 10 is unpressurized. A user of the sprinkler 10 can manually rotate the output member 38 in the clockwise direction when the reversing mechanism 36 is in the forward configuration to identify and/or confirm the locations or the arc shifts with respect to the installation site.

Figure 15:
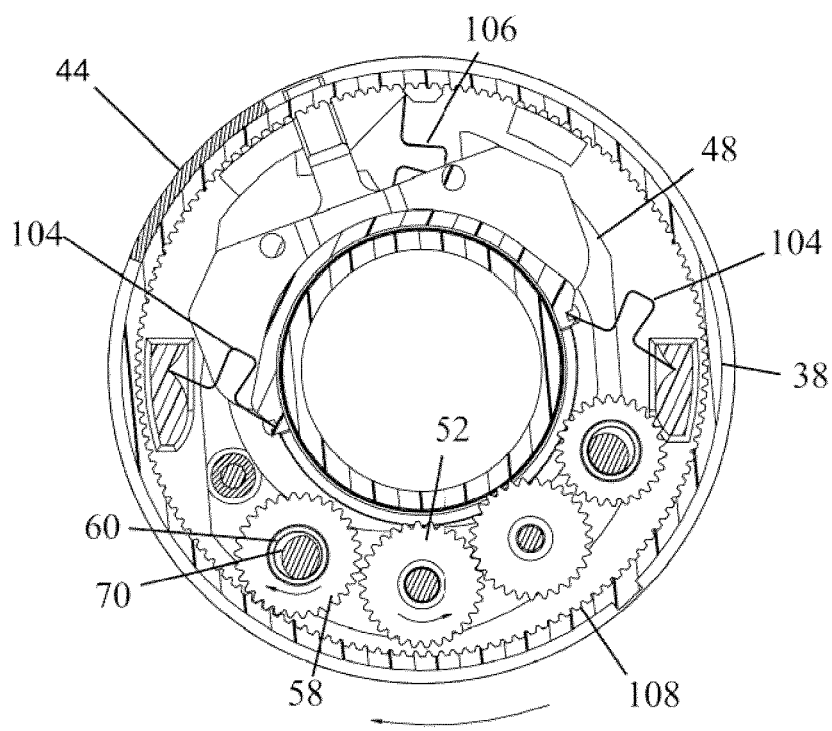
FIG. 15 is an enlarged section view of the reversing mechanism of FIG. 2 shifted to rotate the nozzle in a clockwise direction with the driven gears in a disengaged position as viewed on the cut-plane A-A of FIG. 5.

Manual rotation of the output member 38 (e.g., via manual rotation of the nozzle turret 40) in the first or clockwise direction when the reversing mechanism is in the forward configuration can rotate the first output gear 58 in the clockwise direction. In some cases, manual rotation of the output member 38 will move the first output gear 58 to the disconnected position, as illustrated in FIG. 15 when the manual rotation of the output member 38 is performed at a higher angular velocity than the angular velocity imparted to the output member 38 by the gear reduction 32 and/or first output gear 58. For example, the first output gear 58 can remain meshed with the gear teeth 108 of the output member 38 while moving away from the input gear 52 and disengaging from the bearing portion 72 of the first output axle 70. Moving the first output gear 58 to the disconnected position can inhibit or prevent transmission of the manual rotation to the input gear 52 and/or to the gear reduction 32. In some embodiments, the output gear 58 can remain meshed with the ring gear portion 38*a* of the output member 38 while unmeshing from the input gear 58 due to higher frictional engagement between the output gear 58 and the output member 38 than the frictional engagement between the output gear 58 and the input gear 52. In some cases, the springs 104, 106 force the output gear 58 to remain meshed with the ring gear 108. Inhibiting transmission of the manual rotation to the gear reduction 32 and input gear 52 can reduce the likelihood of damage to the gears via stripping, ratcheting, or otherwise. In some embodiments, disengaging the first output gear 58 from the input gear 52 can reduce ratcheting and/or wear between the first output gear 58 and the gear teeth 108 of the output member 38. Although ratcheting allows for manual rotation of the nozzle housing, it can result in extensive wear of the gear teeth as they ratchet past each other. As the gears ratchet past each other, the entire shifting frame 37 moves towards a center position which can lead to the possibility of the shifting frame 37 getting stuck in a position where is not fully engaged with the output member 38 and the sprinkler 10 can stop rotating during normal operation.

Figure 16:
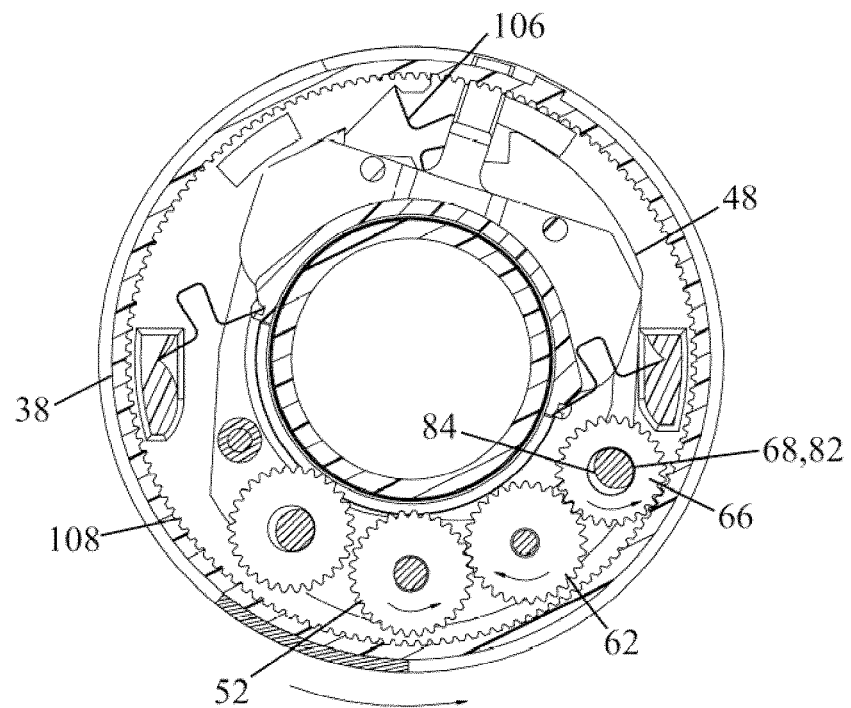
FIG. 16 is an enlarged section view of the reversing mechanism of FIG. 2 shifted to rotate the nozzle in a counter-clockwise direction with the driven gears in an engaged position as viewed on the cut-plane A-A of FIG. 5.
Figure 17:
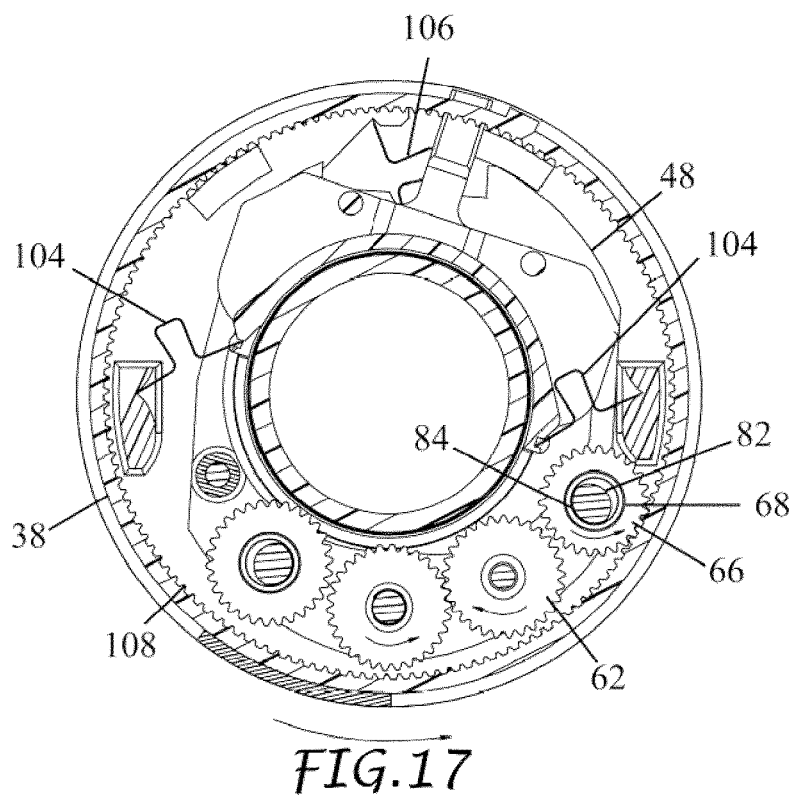
FIG. 17 is an enlarged section view of the reversing mechanism of FIG. 2 shifted to rotate the nozzle in a counter-clockwise direction with the driven gears in a disengaged position as viewed on the cut-plane A-A of FIG. 5.

FIGS. 16 and 17 illustrate the reversing mechanism 36 in a second (e.g., reverse) configuration. In the reverse configuration, the second output gear 66 is meshed with the teeth 108 of the ring gear portion of the output member 38. In some embodiments, as illustrated, the second output gear 66 is directly meshed with the transfer gear 62, which is, in turn, directly meshed with the input gear 53.

In the frame of reference of FIGS. 14 and 15, the input gear 52 rotates in the counterclockwise direction to drive the transfer gear 62 in the clockwise direction. Clockwise rotation of the transfer gear drives the second output gear 66 in the counterclockwise direction. Counterclockwise rotation of the second output gear 66 drives the output member 38 in the counterclockwise direction.

A user of the sprinkler 10 can manually rotate the output member 38 in the counterclockwise direction when the reversing mechanism 36 is in the reverse configuration to identify and/or confirm where the arc shift occurs with respect to the site at which the sprinkler 10 is installed.

Manual rotation of the output member 38 (e.g., via manual rotation of the nozzle turret 40) in the second or counter clockwise direction when the reversing mechanism is in the reverse configuration can rotate the second output gear 66 in the counterclockwise direction. In some cases, manual rotation of the output member 38 will move the second output gear 66 to the disconnected position, as illustrated in FIG. 17 when the manual rotation of the output member 38 is performed at a higher angular velocity than the angular velocity imparted to the output member 38 by the gear reduction 32 and/or second output gear 66. For example, the second output gear 66 can remain meshed with the gear teeth 108 of the output member 38 while moving away from the transfer gear 62 and disengaging from the bearing portion 82 of the second output axle 80. Moving the second output gear 66 to the disconnected position can inhibit or prevent transmission of the manual rotation to the input gear 52 and/or to the gear reduction 32. Inhibiting transmission of the manual rotation to the gear reduction 32 and input gear 52 can reduce the likelihood of damage to the gears via stripping, ratcheting, or otherwise. In some embodiments, disengaging the second output gear 66 from the transfer gear 62 can reduce ratcheting and/or wear between the second output gear 66 and the gear teeth 108 of the output member 38.

The terms "approximately", "about", "generally" and "substantially" as used herein represent an amount close to the stated amount that still performs a desired function or achieves a desired result. For example, the terms "approximately", "about", "generally," and "substantially" may refer to an amount that is within less than 10% of the stated amount.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while a number of variations of the inventions have been shown and described in detail, other modifications, which are within the scope of these inventions, will be readily apparent to those of skill in the art based upon this disclosure. For example, one or more of the claims may be directed to a fixed sprinkler (e.g., not a pop-up sprinkler) incorporating the reversing mechanisms recited above. In some such cases, the sprinkler may not include an outer case.

It is also contemplated that various combinations or sub-combinations of the specific features and aspects of the embodiments may be made and still fall within the scope of the inventions. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A shifting frame for a reversing mechanism of an irrigation sprinkler, the shifting frame comprising:
   a first frame portion having a first surface and a second surface;
   a first post having a first cross-sectional shape with a major axis and a minor axis, the minor axis being smaller than the major axis, the first post extending from the first surface;
   a second post having a second cross-sectional shape with a major axis, the second post extending from the first surface;
   a first output gear having an inner hole with a first diameter, the first output gear mounted on the first post; and
   an input gear having an inner hole with a second diameter, the input gear mounted on the second post;
   the major axis of the first cross-sectional shape of the first post being smaller than the first diameter of the first output gear.

2. The shifting frame of claim 1, further comprising a second frame portion having a first surface and a second surface, the second surface of the second frame portion facing the first surface of the first frame portion, the second frame portion having a first aperture extending from the second surface of the second frame portion toward the first surface of the second frame portion, the first aperture sized and shaped to receive at least a portion of the first post.

3. The shifting frame of claim 1, wherein the minor axis of the first cross-sectional shape passes through a central axis of the second post.

4. The shifting frame of claim 1, further comprising:
   a third post having a third cross-sectional shape with a major axis, the third post extending from the first surface of the first frame portion;
   a transfer gear having an inner hole with a third diameter, the transfer gear mounted on the third post;
   a fourth post having a fourth cross-sectional shape with a major axis and a minor axis, the minor axis of the fourth cross-sectional shape being smaller than the major axis of the fourth cross-sectional shape, the fourth post extending from the first surface of the first frame portion; and
   a second output gear having an inner hole with a fourth diameter, the second output gear mounted on the fourth post,
   the major axis of the fourth cross-sectional shape of the fourth post being smaller than the fourth diameter of the second output gear.

5. The shifting frame of claim 4, wherein the minor axis of the fourth cross-sectional shape passes through a central axis of the third post.

6. The shifting frame of claim 4, further comprising a second frame portion having a first surface and a second surface, wherein one or more of the first post, the second post, the third post, and the fourth post further extends from the second surface of the second frame portion.

7. A shifting frame for an irrigation sprinkler, the shifting frame being configured to transition between a forward configuration and a reverse configuration and having:
   a first post having at least a non-circular shaped portion;
   a first hole laterally spaced from the first post;
   an input gear connected to a drive shaft, the drive shaft being mounted in the first hole; and
   an output gear having an inner hole mounted on the non-circular shaped portion of the first post so that a gap is formed between the non-circular shaped portion and the inner hole at least when the output gear is in a meshed condition with the input gear.

8. The shifting frame of claim 7, wherein a minor axis of the non-circular shaped portion passes through a central axis of the first hole.

9. The shifting frame of claim 7, wherein the output gear is configured to selectively mesh with the input gear.

10. The shifting frame of claim 7, wherein the output gear moves away from the input gear to unmesh from the input gear.

11. The shifting frame of claim 7, further comprising:
a second post having a circular shape; and
a transfer gear mounted on the second post.

12. The shifting frame of claim 11, further comprising:
a third post having at least a non-circular shaped portion; and
a second output gear having an inner hole mounted on the non-circular shaped portion of the third post so that a second gap is formed between the non-circular shaped portion of the third post and the inner hole of the second output gear.

13. The shifting frame claim 12, further comprising one or more transfer gears meshed with the input gear, and wherein the second output gear is configured to selectively mesh with one or more of the one or more transfer gears.

14. The shifting frame of claim 13, wherein at least one of the one or more transfer gears and the second output gear is configured to move laterally to mesh and unmesh from at least one of the one or more transfer gears, the second output gear, and the input gear.

15. A shifting frame for an irrigation sprinkler configured to transition between a forward configuration and a reverse configuration, the shifting frame comprising:
an input gear laterally fixed on the shifting frame;
an output axel having a bearing surface portion; and
an output gear rotatably mounted on the output axel and configured to:
engage with the bearing surface portion to operatively connect with the input gear, and to operatively connect with a ring gear to rotate the ring gear in a forward direction when the irrigation sprinkler is in the forward configuration, and
disengage from the bearing surface portion and to operatively disconnect from the input gear when a user manually rotates the ring gear in the forward direction when the irrigation sprinkler is in the forward configuration.

16. The shifting frame of claim 15, wherein the output axel has a non-circular cross-section so as to form a gap with the output gear.

17. The shifting frame of claim 15, further comprising:
at least one transfer gear operatively connected with the input gear;
a second output axel having a second bearing surface portion; and
a second output gear rotatably mounted on the second output axel and configured to:
engage with the second bearing surface portion, to operatively connect with the at least one transfer gear, and to operatively connect with the ring gear to rotate the ring gear in a reverse direction when the irrigation sprinkler is in the reverse configuration; and
disengage from the second bearing surface portion and to operatively disconnect from the at least one transfer gear when a user manually rotates the ring gear in the reverse direction when the irrigation sprinkler is in the reverse configuration.

18. The shifting frame of claim 17, wherein the second output axel has a non-circular cross-section.

19. The shifting frame of claim 15, comprising an even number of transfer gears positioned in a forward power transmission path between the input gear and the output gear.

20. The shifting frame of claim 17, comprising an odd number of the at least one transfer gear positioned in a reverse power transmission path between the input gear and the second output gear.

21. A shifting frame for an irrigation sprinkler, the shifting frame being configured to transition between a forward configuration and a reverse configuration and having:
an input gear connected to a drive shaft so as to rotate with the drive shaft;
a first hole having a bearing surface supporting the input gear and the drive shaft to reduce or inhibit a wobbling motion when the input gear and the drive shaft rotate;
a first post laterally spaced from the first hole and having at least a non-circular shaped portion; and
an output gear having an inner hole mounted on the non-circular shaped portion of the first post so that a gap is formed between the non-circular shaped portion and the inner hole at least when the output gear is in a meshed condition with the input gear.

* * * * *

UNITED STATES PATENT AND TRADEMARK OFFICE
CERTIFICATE OF CORRECTION

PATENT NO. : 10,717,093 B2
APPLICATION NO. : 16/035522
DATED : July 21, 2020
INVENTOR(S) : James A. Bell Page 1 of 1

It is certified that error appears in the above-identified patent and that said Letters Patent is hereby corrected as shown below:

In the Specification

In Column 12, Line 31, delete "1/3of" and insert --1/3 of--.

In the Claims

In Column 17, Line 22, Claim 13, after "frame" insert --of--.

Signed and Sealed this
Sixth Day of October, 2020

Andrei Iancu
*Director of the United States Patent and Trademark Office*